(12) United States Patent
Shincovich

(10) Patent No.: US 6,844,825 B2
(45) Date of Patent: Jan. 18, 2005

(54) ELECTRIC ENERGY SERVICE APPARATUS WITH TAMPER DETECTION

(75) Inventor: John T. Shincovich, North Canton, OH (US)

(73) Assignee: Ekstrom Industries, Inc., Farmington Hills, MI (US)

( * ) Notice: Subject to any disclaimer, the term of this patent is extended or adjusted under 35 U.S.C. 154(b) by 534 days.

(21) Appl. No.: 09/962,562

(22) Filed: Sep. 25, 2001

(65) Prior Publication Data
US 2002/0074990 A1 Jun. 20, 2002

Related U.S. Application Data

(60) Provisional application No. 60/235,122, filed on Sep. 25, 2000.

(51) Int. Cl.⁷ .............................................. G08C 13/00
(52) U.S. Cl. .................. 340/870.02; 324/110; 340/637
(58) Field of Search ...................... 340/870.02, 637, 340/568.4; 324/110, 74, 142; 439/95; 307/130, 131; 702/62, 58, 61

(56) References Cited

U.S. PATENT DOCUMENTS

| | | | |
|---|---|---|---|
| 3,170,090 A | 2/1965 | Waldrop | 317/104 |
| 5,129,841 A | 7/1992 | Allina et al. | 439/517 |
| 5,184,119 A | 2/1993 | Stanbury et al. | 340/835 |
| 5,227,668 A | 7/1993 | Mutch et al. | 307/131 |
| 5,293,115 A | 3/1994 | Swanson | 340/568 |
| 5,423,695 A | 6/1995 | Robinson et al. | 439/517 |
| 5,473,322 A | 12/1995 | Carney | 340/870 |
| 5,485,393 A | 1/1996 | Bradford | 364/483 |
| 5,488,565 A * | 1/1996 | Kennon et al. | 700/306 |
| 5,523,559 A | 6/1996 | Swanson | 250/222 |
| 5,590,179 A | 12/1996 | Shincovich et al. | 379/107 |
| 5,617,084 A | 4/1997 | Sears | 340/870 |
| 5,631,843 A | 5/1997 | Munday et al. | 364/492 |
| 5,940,009 A | 8/1999 | Loy et al. | |
| 5,944,555 A | 8/1999 | Robinson et al. | 439/517 |
| 6,054,930 A | 4/2000 | Guillon | 340/637 |
| 6,118,269 A | 9/2000 | Davis | 324/110 |
| 6,232,886 B1 | 5/2001 | Morand | |
| 6,236,197 B1 | 5/2001 | Holdsclaw et al. | |
| 6,362,745 B1 | 3/2002 | Davis | |

* cited by examiner

Primary Examiner—Michael Horabik
Assistant Examiner—Hung Q Dang
(74) Attorney, Agent, or Firm—Young & Basile, PC

(57) ABSTRACT

A method and apparatus for detecting a tamper event in an electrical power metering apparatus having power distribution and power service conductors connected to jaw contacts in a socket housing, the jaw contacts receiving blade terminals of an electrical service meter apparatus. A tamper event signature is detected based on a time relationship between separation of the ground circuit between the electrical power metering apparatus and the socket and the separation of at least one of the power distribution and power service blade terminals from the socket jaw contacts due to removal of the electrical service apparatus from the socket.

18 Claims, 22 Drawing Sheets

Sensor Hardware Functional Diagram

Sensor Software Flow Chart

ELECTRIC ENERGY SERVICE APPARATUS WITH TAMPER DETECTION

CROSS REFERENCE TO CO-PENDING APPLICATION

This application claims the benefit of the filing date of co-pending provisional U.S. Patent Application Ser. No. 60/235,122, filed Sep. 25, 2000 and entitled "POINT OF USE DIGITAL ELECTRIC ENERGY MEASUREMENT, CONTROL AND MONITORING APPARATUS".

BACKGROUND

The present invention relates, in general, to apparatus for measuring and controlling the supply of electric energy at a use site and, more particularly, to such apparatus which also detect a tamper event involving the apparatus.

In the electric utility industry, watthour meters are typically employed to measure electric power used at a building or home site. A socket housing is mounted on a convenient wall of the residence or commercial building and contains pairs of line and load terminals which are respectively connected to the electric utility line conductors and the building load distribution conductors. The terminals typically receive blade contacts on a plug-in watthour meter to complete an electric circuit through the meter between the line and load terminals.

Plug-in socket adapters and socket adapters/extenders, both hereafter referred to simply as socket adapters, are designed to plug into the meter socket housing terminals. Such socket adapters are employed to convert a ringless style socket to a ring style socket or to extend the mounting position of the jaw terminals in the socket outward from the socket for mounting various electrical equipment, such as test devices or survey recorders, in the socket. The watthour meter is then plugged into jaw contacts carried within the socket adapter. The socket adapter jaw contacts are connected, either integrally or via separate electrical connections, to blade terminals extending rearwardly of the socket adapter housing for plug-in engagement with the socket terminals or jaw contacts.

Meter reading personnel periodically inspect each meter site and record utility meter readings, either visually or by using a probe to retrieve power usage data stored in solid state memory of the watthour meter.

To increase data collection efficiency and reliability, watthour meters are now available which include interface equipment designed to permit remote interrogation of the meter and transmission of electric power usage data. Utility meters located at each customer site are connected in data communication to a central billing facility via various communication methods, including power line signal transmission, dedicated signaling lines, use of the public telephone switching network, and radio frequency signal transmission.

Another factor which arises with any watthour meter design, whether of the automatic reading type or a more conventional, electronic or mechanical watthour meter, is the ability to detect tampering with the meter, such as the removal of the meter to insert wires to bypass the meter and thereby obtain free, unmetered power. In addition to removing the meter, certain tampering events involve the removal and the replacement of the meter in an inverted position in the socket so as to cause reversal of the rotation of the measuring disk.

As a result of increased usage of automatic meter reading installations, on-site inspection of the watthour meter mounting configuration by utility personnel has become less frequent. This has encouraged would be tamperers to increase their efforts to unauthorizedly obtain electric power from the meter socket without payment. This is despite the elaborate anti-tampering design features built into each watthour meter, meter socket adapter and meter socket and other tampering detection circuits and devices.

Older tamper detection devices were mechanical in nature and frequently included an orientation sensitive switch, also known as a tilt switch, which detected reverse mounting of the watthour meter in the socket after the meter is first removed from the socket. Once removed, a single phase meter could be installed upside down resulting in reverse rotation of the meter disc and register dials which record cumulative energy consumption. The existence of a single tampering event or the recording of the number of times a tampering event was typically detected and stored in a memory device in the watthour meter.

While effective, such mechanical tampering detection devices still require some type of on-site inspection to determine the tamper detection elements detected a tampering event. As noted above, such on-site inspections are typically at a decreased frequency such that tampering may go on undetected for a considerable length of time.

While the introduction and increasing use of automatic meter reading equipment lengthens the time between on-site inspections of meter installations, the direct communication capabilities of such automatic meter reading equipment can provide an immediate indication of an on going tampering event thereby allowing the utility to take immediate corrective action to stop the unauthorized use of electric power at a particular meter site.

Thus, it would be desirable to provide an electric energy measurement apparatus which overcomes the problems of previously electric energy measurement or meter reading apparatus with respect to detecting and communicating tampering events. It would be desirable to provide an electric energy measurement apparatus capable of utilizing communications through a global telecommunication network between the remote meter units and a central site. It would also be desirable to provide an electric energy measurement apparatus which is capable of detecting, reporting, and, optionally, taking action to report and/or disconnect electric power to a use site whenever a tamper event is detected.

SUMMARY OF THE INVENTION

The present invention is a method and apparatus for detecting a tamper event at an electrical power metering site having an electrical service apparatus mountable in a meter socket and completing a circuit between power service conductors and power distribution conductors connected to the meter socket terminals or jaw contacts.

In one aspect of the invention, the method of detecting a tamper event comprises the steps of:
  detecting the opening of a ground circuit between a ground in the socket and a ground in the metering apparatus; and
  detecting a time period between the opening of the ground circuit and the time when the load current through one of the electric power distribution conductors is zero. The time period indicates a tamper event signature.
Specifically, the inventive method includes the steps of:
  detecting a voltage and a current in each of first and second electric power distribution conductors;

detecting a ground voltage and a ground current in the ground circuit; and detecting a tamper event based on a time relationship between changes in the voltage and current in the ground circuit and the voltage and current of at least one of the first and second electric power distribution conductors.

The present method also includes the steps of:

detecting the opening of the ground circuit by detecting when the ground voltage is greater than zero at a time when the ground current equals zero; and detecting the time lapse by detecting when the current through the first and second power distribution conductors equal zero. Upon detecting a time lapse, the method generates a tamper signal. The signal is preferably stored along with the time and date of the tamper event.

In another aspect of the invention, the method includes the steps of:

providing a power control switch having contacts switchable between open and closed positions, the contacts connected between one power service conductor and one power distribution conductor; and using the tamper signal to switch the power control switch contacts to the open position upon reapplication of electric power to the power service conductors after a tamper event has been detected.

In a specific aspect, the time relationship defining the tamper event signature is determined by the steps of:

detecting a first event when the ground current equals zero and the ground voltage is greater than zero at the same time;

detecting a second event when the current in at least one of the first and second power distribution conductors equals zero; and determining the existence of a tamper event signature when the second event is later in time than the first event.

The first and second events are determined by respectively:

detecting the separation of a ground tab on an electrical service apparatus housing inserted into the socket from a ground connection in the socket; and detecting a separation of the electrical service apparatus blade terminals from jaw contacts in the socket.

In another aspect, the present invention defines an apparatus for detecting tampering with an electrical service apparatus formed of an electrical power socket with a ground circuit and at least two power distribution conductors and at least two power service conductors connected to jaw contact in the socket and an electric power metering apparatus with blade terminals mountable in the socket jaw contacts, the electric power metering apparatus having a ground member releasably engageable with the socket ground circuit when the metering apparatus is mounted in the socket. The apparatus includes:

voltage and current sensors for measuring the voltage and the current on at least two power load conductors;

ground voltage and ground current sensors; and control means for detecting a tamper signature based on the relationship between the ground voltage and the ground current and the voltage and the current through at least one of the power load conductors.

Specifically, the apparatus further includes:

means for detecting a time delay between first and second events occurring in a time relationship during removal of the electrical power metering apparatus from the socket.

In a specific implementation, the present invention is embodied in an electrical metering apparatus of a service apparatus having:

a housing having a base with a sidewall extending from the base;

line blades mounted through the base and connected to jaw contacts electrically connected to electric power service conductors;

load blades mounted through the base and connected to jaw contacts in the meter socket connected to electric power distribution conductors;

a switch mounted within the housing and having switchable first and second contacts, each first and second contact connected between one line blade and one load blade;

the switch having an input responsive to a tamper signal generating means for switching the first and second contacts between open and closed positions between the line blades and load blades.

In summary, the electric energy service method and apparatus with tamper detection of the present invention makes use of the control unit and data communication capabilities of an automatic meter reading apparatus to detect tamper events concerning the metering installation and then immediately reporting the detected tamper event to the central utility site. The present invention also enables the central utility site to immediately take corrective action via a circuit breaker or switch mounted in the apparatus to disconnect electric power at the metering site when a tamper event has been detected.

BRIEF DESCRIPTION OF DRAWINGS

The various features, advantages and other uses of the present invention are more apparent by referring to the following detailed description and drawing in which.

DETAILED DESCRIPTION

Figure 1:
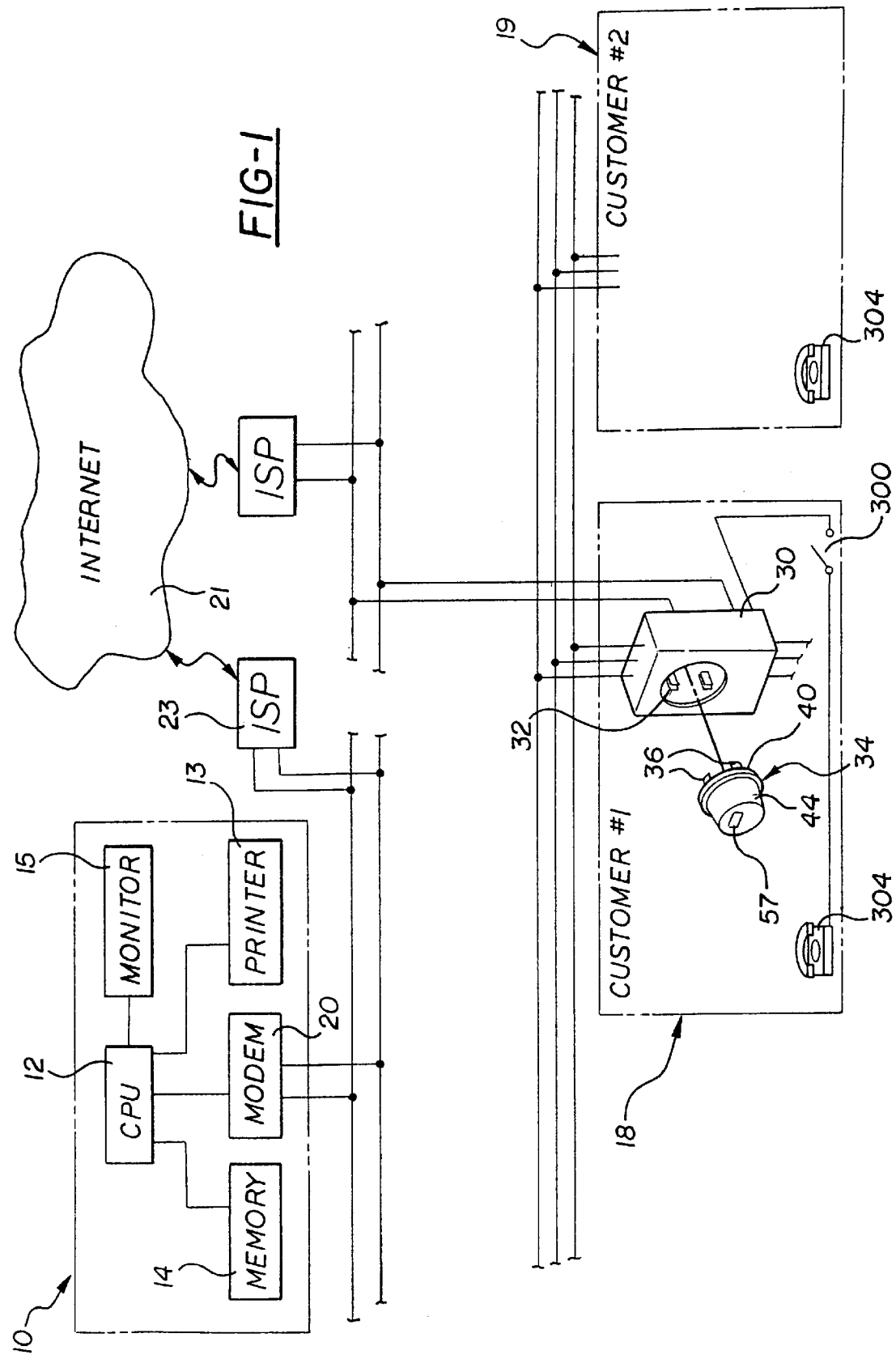
FIG. 1 is a schematic diagram of an electric energy management apparatus according to the present invention.

Referring now to the drawing, there is depicted a point of use, digital, electrical energy measurement, control and monitoring apparatus for use at individual utility customer sites which has connectivity through a global telecommunication network to a centralized computer control system.

Central Utility

As shown in FIG. 1, a central utility company site is depicted generally by reference number 10. The central utility site 10 may be the central business office of the utility, a generating station, etc., where utility billing information is accumulated, tabulated and recorded. A central processing unit 12 is located at the central site 10. The central processing unit 12 may be any suitable computer, such as a mainframe, a PC, a PC network, workstation, etc., having the capacity of handling all of the utility company customer billing transactions and/or the remote data communications described hereafter. The central processing unit 12 communicates with a memory 14 which stores, identification data specific to each utility customer, as well as other data regarding the power usage of each customer. The memory 14 may include both hard disc storage memory and on-board memory. Although high voltage, electrical power distribution lines denoted generally by reference number 16 for a three-wire, single-phase electrical system, are shown as extending between the central utility site 10 to each utility customer 18, 19, etc., it will be understood that the electrical power distribution lines 16 may extend from a separate electrical power generating site with appropriate voltage transformations to each customer site, and not directly from the central utility site 10. Further, it will be understood that the electrical power distribution lines 16 may provide three-phase power to any customer site.

As shown in FIG. 1, various input and output devices, such a keyboard, printer(s) 13, display terminals or monitors 15, etc., may also be connected to the central processing unit 12 as is conventional. In addition, one or more modems 20 are connected to the central processing unit 12 at the central utility site 10 and to a conventional telephone wiring network denoted generally by reference number 22. The telephone wiring network 22 may be conventional telephone wires, as well as fiber optics, satellite, microwave, cellular telephone communication systems and/or combinations thereof. The modem 20, which may be any conventional modem, functions in a known manner to communicate data between a processor and the telephone network.

Also stored in the memory 14 are the various software control programs used by the central processing unit 12 to automatically communicate with the electrical energy management apparatus at each utility customer 18, 19 as described hereafter. The memory 14 also stores the power usage data for each utility customer 18, 19 as well as various billing routines utilized by a particular utility company.

Generally, the software control program stored in the memory 14 is a menu driven database capable of handling multiple simultaneous calls to a number of remote apparatus at the customer sites 18, 19. The control program stores each customer's power usage in accumulated KWH and KVA, for example, and instantaneous voltage, current and power factor measurements. Also, the control program generates periodic summary printouts via the printer 13.

The control program enables the utility to remotely program each energy management apparatus from the central site 10. Such programmable features include time, date and year data, a multi-level security code for communication access, receive call and originate call modes, line voltage quality set points, start and end times for multiple demand billing period intervals, i.e., three intervals in each 24 our period, the date, time and duration of a communication window for communication with the central site 10, etc.

Various main system menu screens may be generated by the CPU 12 to enable communication with any of the remote units. Further details concerning the generation and use of such menu screens can be had by referring to U.S. Pat. No. 5,590,179, the entire contents of which are incorporated herein by reference.

According to a unique feature of the present automatic meter reader apparatus, CPU 12 communicates with a global telecommunications network that is separate from the conventional telephone line network 22 through an interface including a modem connection 20 to an Internet service provider (ISP) 20 which communicates with a worldwide telecommunications network, such as the Internet or world wide web. The CPU 12 can generate an appropriate identification number (I.D.) or address for any of the remote units. This I.D. can be transmitted by the ISP 20 through the Internet 21 to any of the individual use sites 18, 19, etc.

Remote Utility Customer

Figure 2:
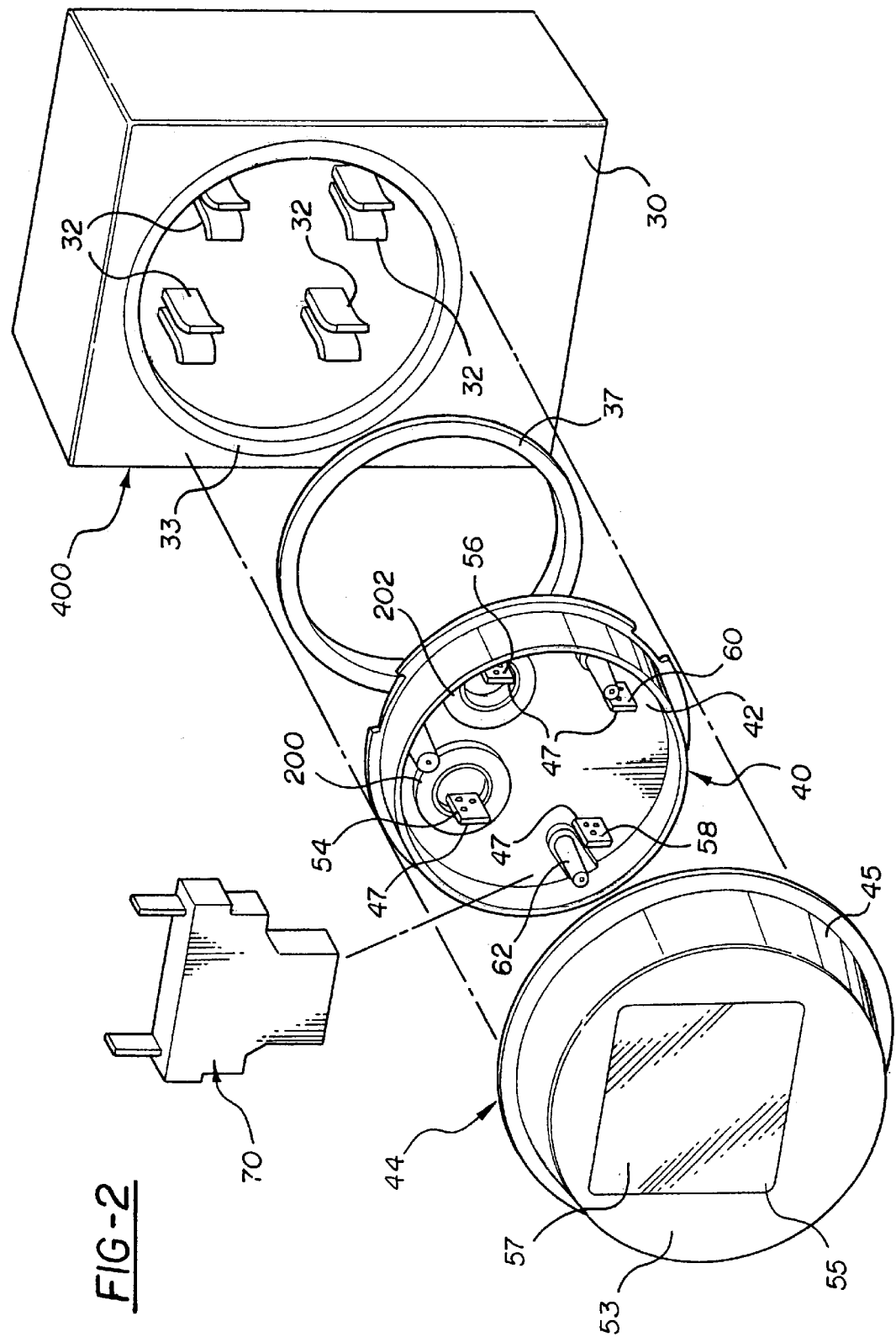
FIG. 2 is an exploded, perspective view showing the electric energy management apparatus according to the present invention mountable in a watthour meter socket.

As shown in FIGS. 1 and 2, a plurality, such as tens or even hundreds or thousands of utility customer sites 18, 19, are connected to the electrical power distribution network 16 at remote locations of varying distances from the central utility company site 10.

As is conventional, each utility customer site 18, as shown in FIG. 1, includes a conventional utility meter socket 30 having a plurality of internally mounted jaw contacts or terminals 32 which are connected to the single-phase three-wire line conductors of the electrical distribution network 16. Although not shown in FIG. 1, the separate jaw terminals 32 in the socket 30 are connected to the individual service or load conductors at each utility customer site 18. In a conventional application, the socket 30 is mounted at a suitable location at the utility customer site 18, such as on an exterior wall, with the load conductors extending from the socket 30 to the building wiring circuits.

Remote Unit

A digital, electric energy management apparatus (hereafter "remote unit") 34 is provided for recording, measuring, controlling and monitoring electrical power usage at a particular customer site 18. The remote unit 34 has a plurality of outwardly extending, blade-type, electrical terminals 36 which electrically engage the jaw contacts or terminals 32 in the socket 30.

Figure 3:
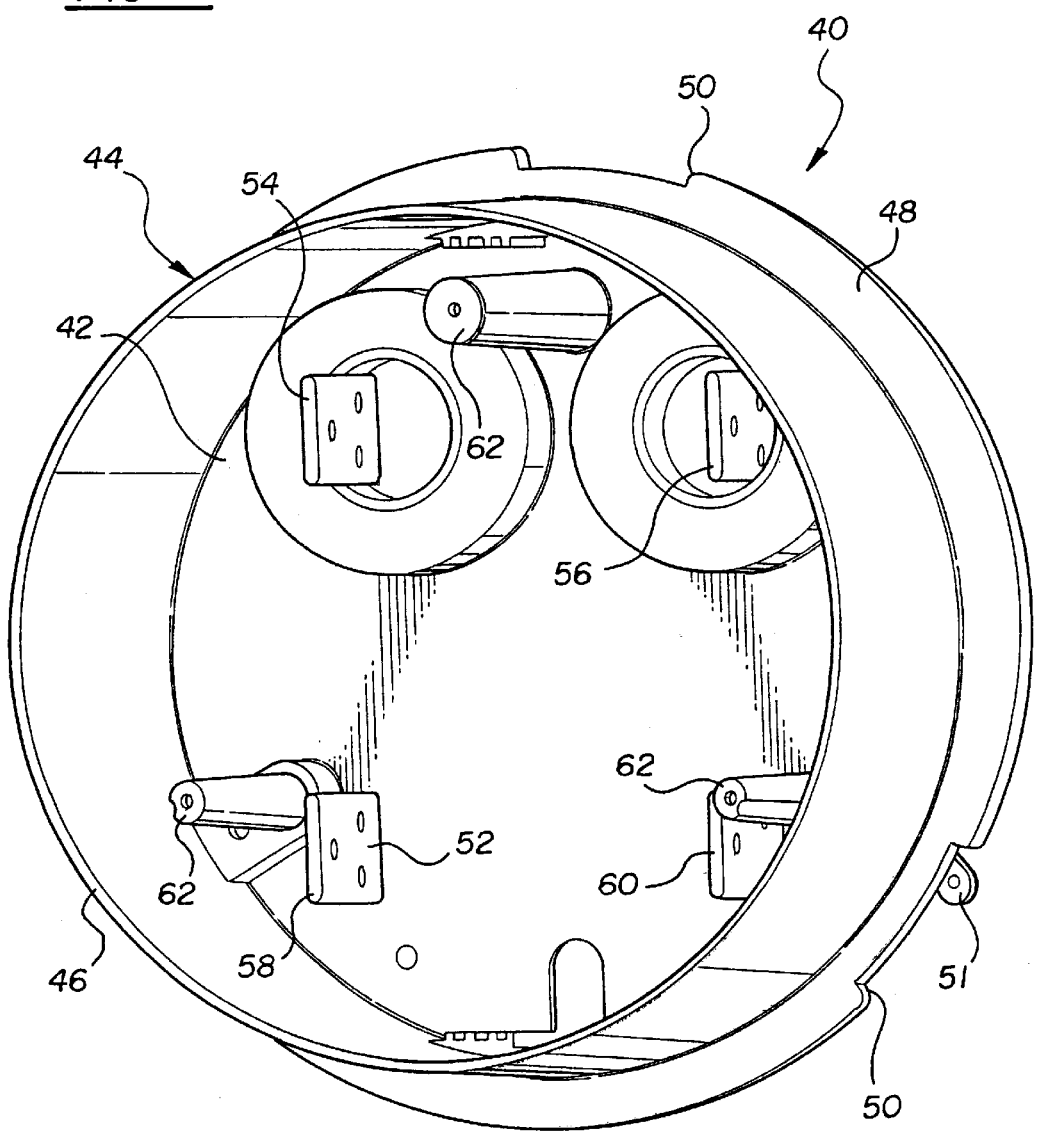
FIG. 3 is a perspective view of the electric energy management apparatus without the internal circuit board, the disconnect switch and the shell.
Figure 4:
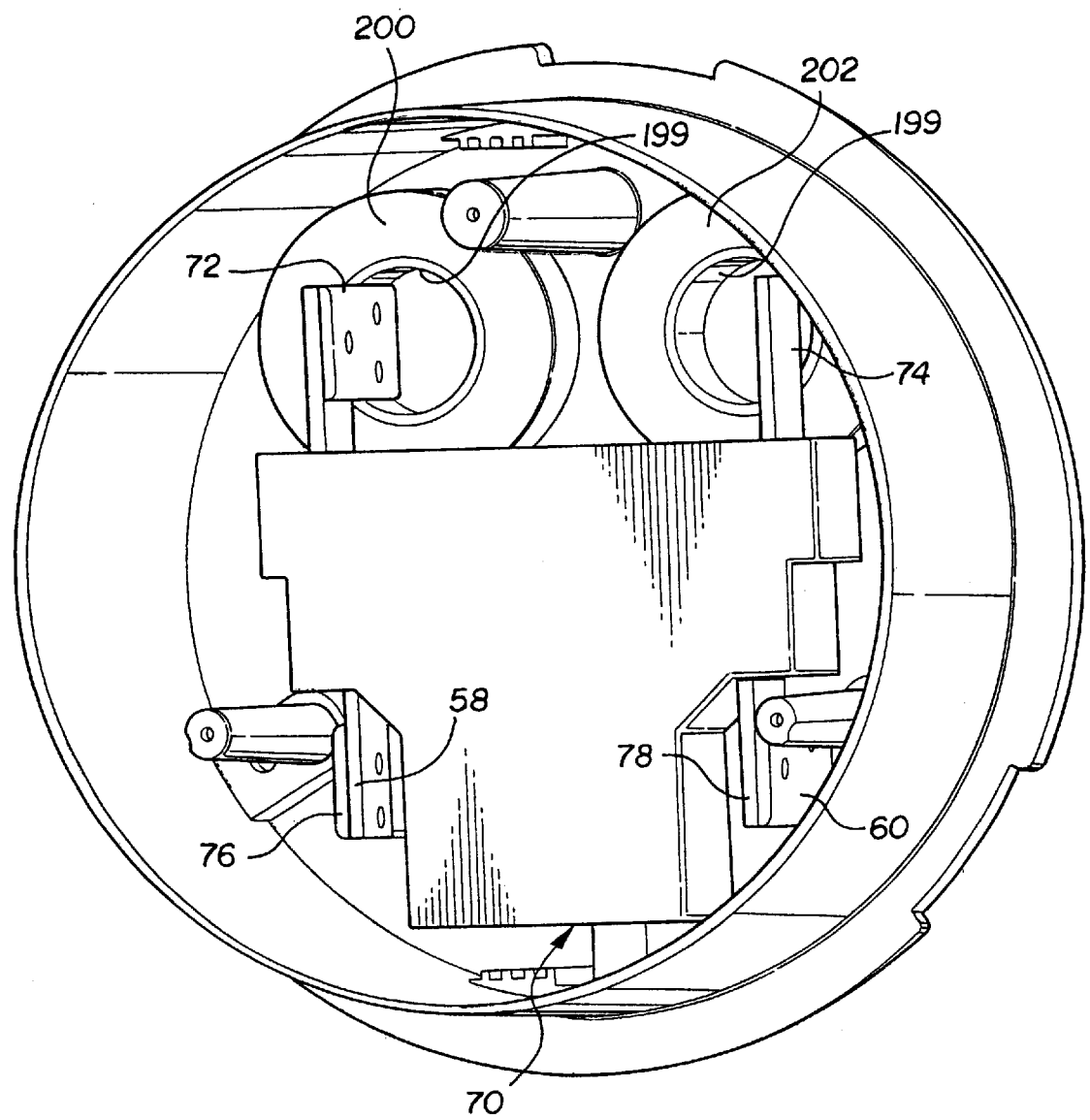
FIG. 4 is a perspective view of the electric energy management apparatus shown in FIG. 3 including the optional disconnect switch.
Figure 5:
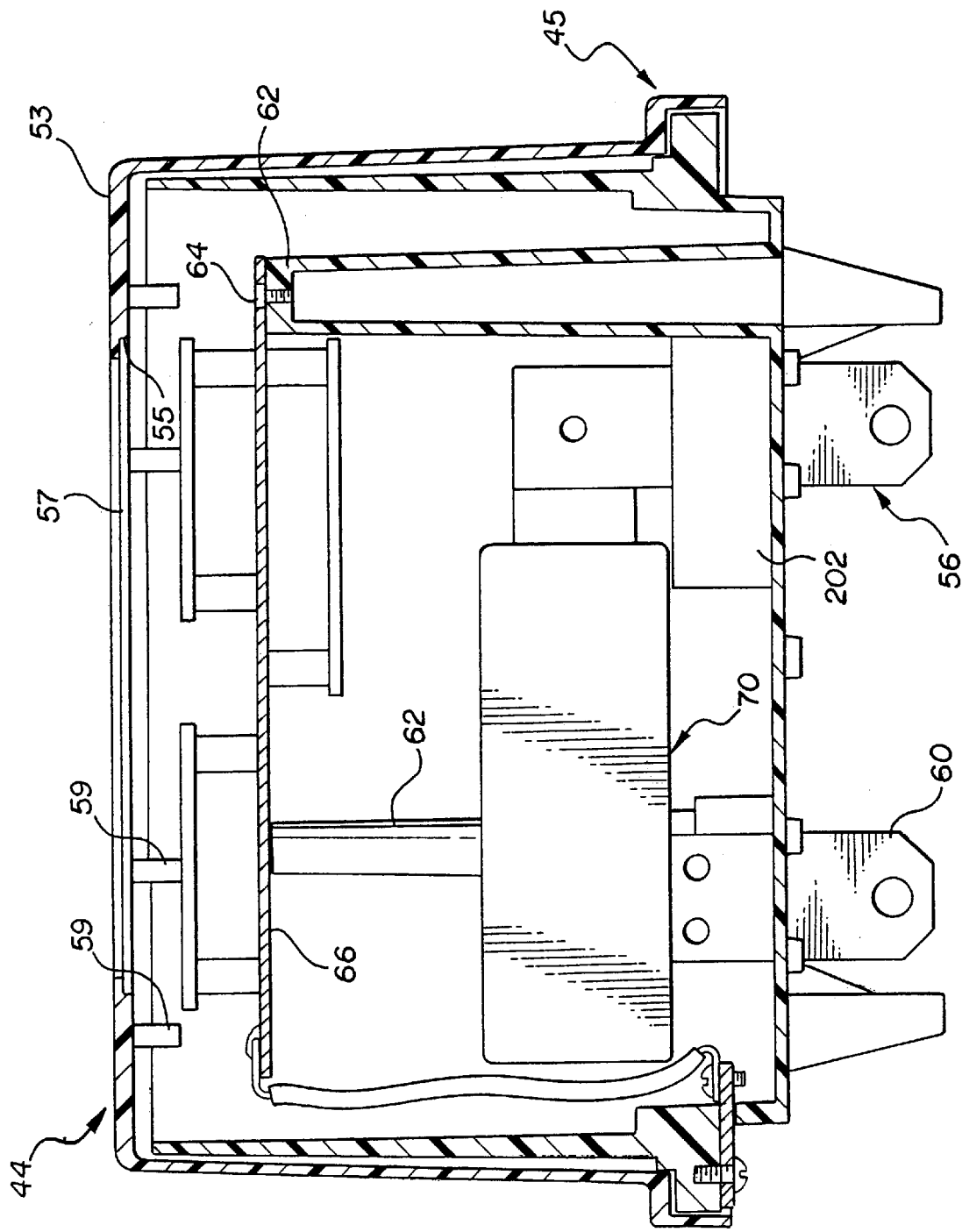
FIG. 5 is a side elevational view of the housing of the electric energy management apparatus with a portion of the sidewall of the housing removed to show the internal components of the electric energy management apparatus of the present invention.
Figure 6:
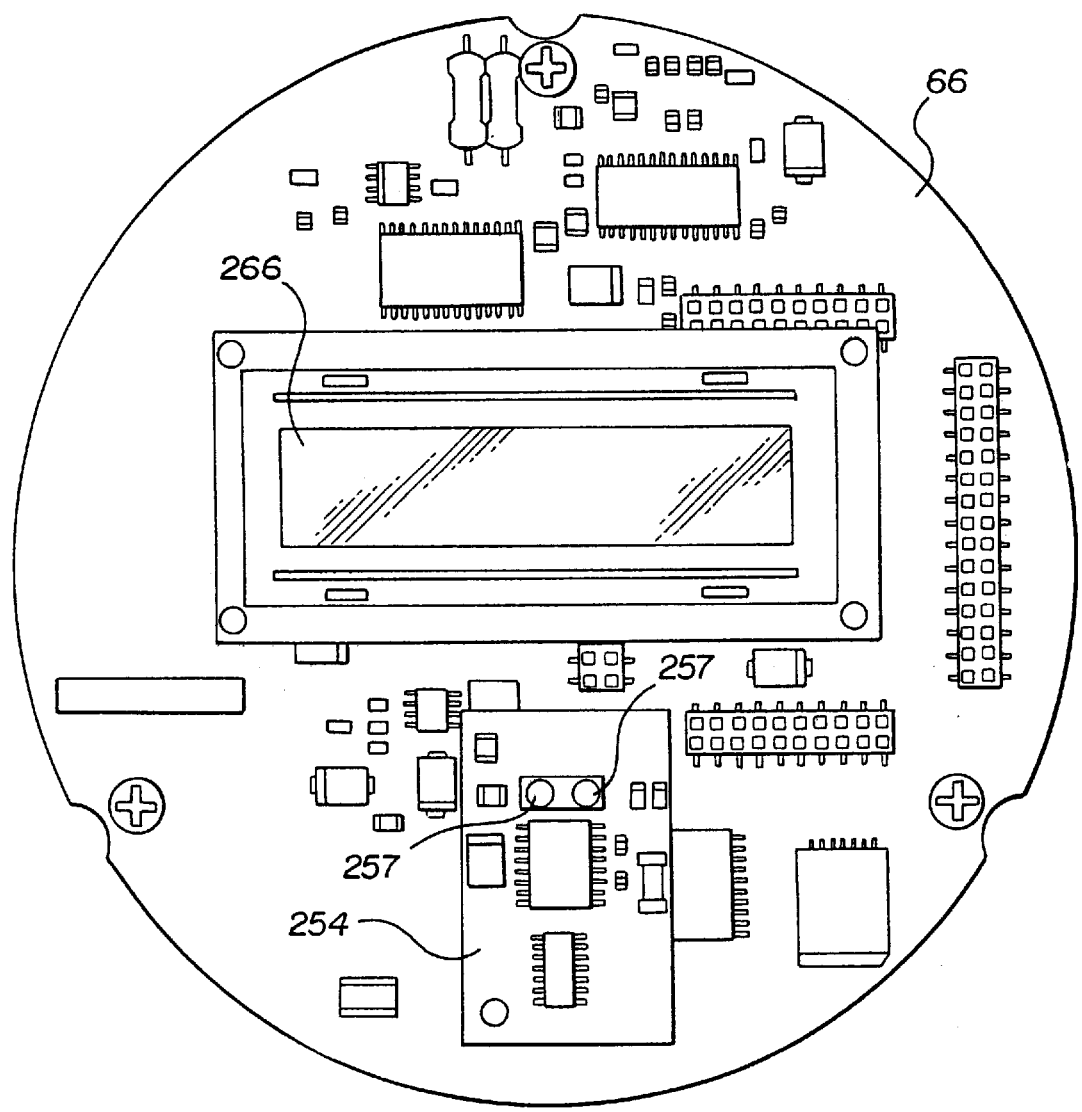
FIG. 6 is a front elevational view of the circuit board of the electric energy management apparatus shown in FIG. 5.
Figure 7:
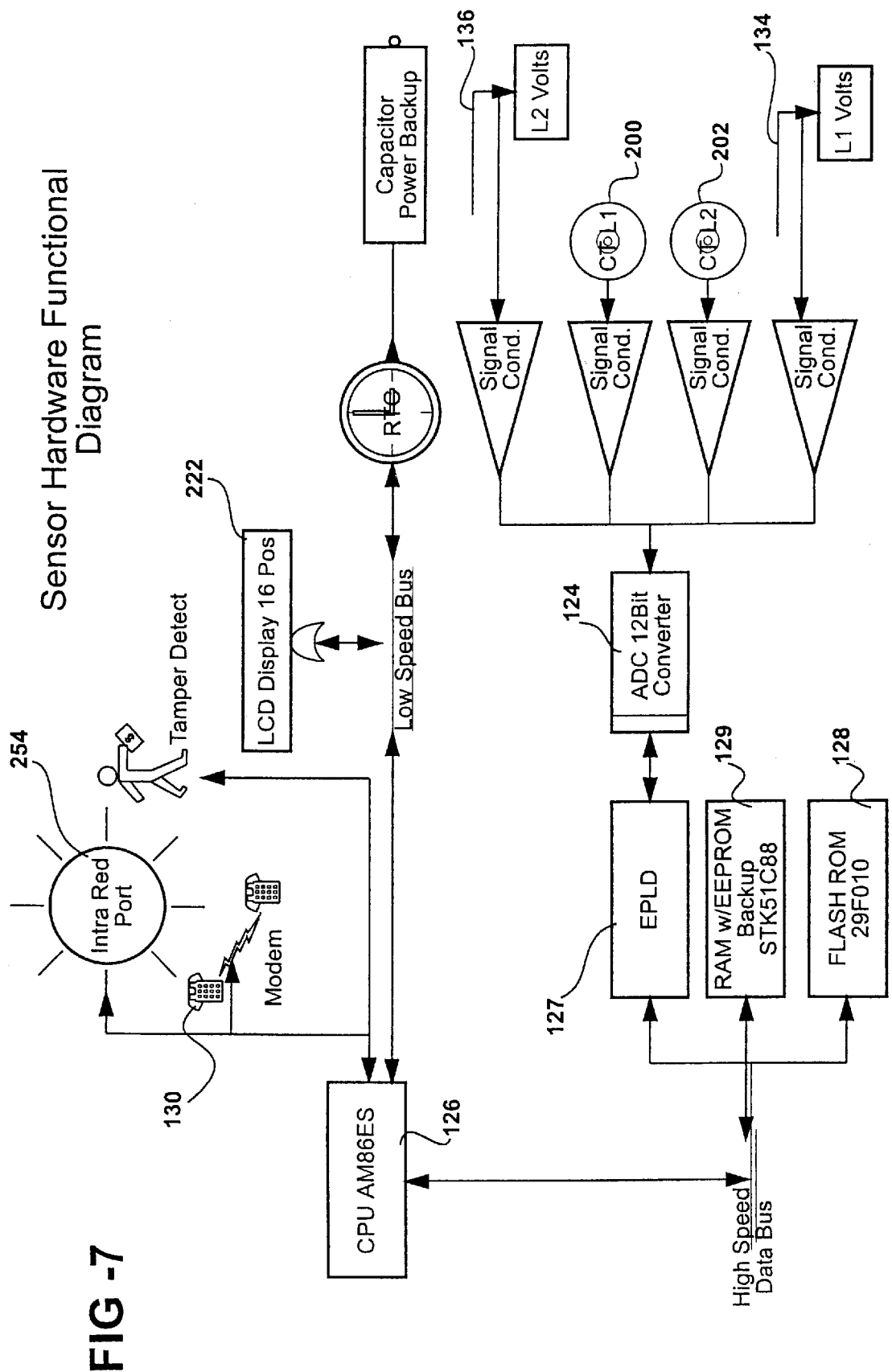
FIG. 7 is a block diagram of the major components of the electric energy management apparatus at one customer use site.

As shown in FIGS. 1 and 2, and in greater detail in FIGS. 3, 4 and 5, the remote unit 34 of the present invention, in a preferred embodiment, includes a base denoted generally by reference number 40. The base 40 is snap-in connectable in the meter socket 30. However, according to the present invention, the base 40 includes internally mounted electrical energy measurement and telecommunication circuits as described in greater detail hereafter. The use of the base 40 to house the automatic meter reading circuitry is a preferred embodiment of the present invention. It will be understood, however, that such electrical energy measurement and control circuitry, as described hereafter, can also be mounted at each customer site 18, 19 by other means, such as in an enclosure separate from a standard watthour meter and the meter socket.

In general, the remote unit 34 includes a two-part housing formed of the base 40 having a base wall 42 and a shell 44 which are releasably joined together by a snap-in and rotate connection. As described hereafter, a plurality of electrical terminals 34 are mounted in the base 40. The electrical terminals 47 are provided in the base 40 in any number, type and arrangement depending upon the electrical power service for a particular application. By way of example only, the electrical terminals 47 are arranged in the base 40 in a first pair of line terminals 54 and 56 and a second pair of load terminals 58 and 60.

A peripheral flange 48 is formed on the base 40 which mates with a similarly formed flange 33 on the watthour meter socket or housing 30 for mounting the remote unit 34 to the watthour meter socket 30. A conventional seal or clamp ring 62, such as a seal ring disclosed in U.S. Pat. No. 4,934,747, the contents of which are incorporated herein by reference, is mountable around the mating flanges 48 and 33 to lockingly attach the remote unit 34 to the socket 30 and to prevent unauthorized removal of or tampering with the remote unit 34.

It will also be understood that the remote unit 34 and the socket 30 may be configured for a ringless connection. In this type of connection, not shown, the cover of the socket 30 is provided with an aperture which is disposable over the remote unit 34. The cover is locked to the socket 30 enclosure after the remote unit 34 has been inserted in the socket 30 and through the aperture in the cover.

The base 40 and the base wall 42 has generally circular configuration centered within an integrally formed annular side wall 44 which terminates in an outer edge 46. The flange 48 projects radially outward from the sidewall 44 at the general location of the base wall 42. A plurality of circumferentially spaced notches 50 are formed in the flange 48 for reasons which will be described in greater detail herein.

At least one and preferably two ground tabs 51, only one of which is shown in FIG. 3, are mounted on the exterior surface of the base wall 42 and have an radially outer end which is positioned within one of the notches 51 as shown in FIG. 3. The ground tabs 51 are adapted to engage a ground connection in the meter socket 30, as is conventional and as is described in greater detail hereafter.

The shell 44 has a generally cylindrical configuration formed of a sidewall 45 and an end wall 53. An annular flange 47 projects radially from one end of the sidewall 45 as shown in FIGS. 2 and 5. The flange 47 has a stepped shape formed of a radially extending leg and an axially extending leg. The flange 47 overlays the flange 48 on the base 40 and receives the sealing ring 37 thereover as described above.

A plurality of arcuate slots 49, such as three slots 49 by way of example only, are formed in the radially extending leg of the flange 47. A generally L-shaped lock arm 51 projected interiorly from the radially extending leg of the flange 47 along one inside edge of each slot 49, as shown in FIG. 5. The L-shaped lock arm 51 is alignable with one of the notches 51 in the base 40 when the shell 44 is joined to the base 40. Rotation of the shell 44 relative to the base 40 causes the lock arm 51 to slide underneath the bottom edge of the flange 48 on the base 40 to lock the shell 44 to the base 40.

It will be understood that alignable apertures may be formed in the flange 47 of the shell 44 and the flange 48 of the base 40 in the rotated, locked position for receiving a seal member, such as a conventional watthour meter seal ring, not shown, to lockingly attach the shell 44 to the base 40 and to provide an indication of tampering with the remote unit 34 after the remote unit 34 has been mounted on the socket 30.

As also shown in FIGS. 1 and 2, and in greater detail in FIG. 5, the end wall 53 of the shell 44 is provided with an aperture 55 which has an under notch or undercut formed about the periphery of the aperture 55 as shown in FIG. 5. The aperture 55 is adapted for receiving a transparent cover 57, formed, by example, of Lexan, and having a notched peripheral edge which fits within the undercut formed about the periphery of the aperture 55. A plurality of posts 59 project inwardly from the undercut surrounding the aperture 55 in the end wall 53 of the shell 44 and are adapted to engage apertures formed about the periphery of the cover 57 to align and mount the cover 57 to the end wall 53. Fasteners, such as lock nuts, not shown are mountable over the posts 59 to lock the cover 57 in the end wall 53.

Although not shown in FIG. 5, portions of the transparent cover 57 are masked or blacked out to provide separate windows, one for the display 222 and one for the opto-communication port 134.

A plurality of apertures 52 are formed in the base wall 42 at the normal jaw contact positions of a watthour meter. For the single phase remote unit 34 described herein by way of example only, four apertures 52 are formed in the base wall 42 and respectively received the line blade terminals 54 and 56 and the load blade terminals 58 and 60. The blade terminals 54, 56, 58 and 60 have one end portion disposed interiorly within the base 40 extending away from one side of the base wall 42 and an external portion, shown in FIG. 5, which projects exteriorly of the opposed surface of the base wall 42 and adapted to slidably engage the jaw contacts 32 in the watthour meter socket 30.

Although not shown, one of the apertures formed in the exterior portion of each blade terminal 54, 56, 58 and 60 can receive a lock member, such as a cotter pin, conventionally used in watthour meters, to fixedly secure each blade terminal 54, 56, 58 and 60 to the base wall 44.

A plurality of bosses 62, such as three bosses by way of example only, are formed on the base wall 42 and project therefrom to co-planar upper ends as shown in FIG. 5. Each boss 62 can be solid or hollow, but has an upper end bore 64 adapted to receive a fastener, such as a screw, for securing a circuit board 66 containing the remote unit 34 circuitry thereon. Thus, the bosses 62 form a support for the circuit board 66 as shown in FIG. 5. This spaces the circuit board 66 above the blade terminals 54, 56, 58 and 60 as well as above an optional disconnect switch 70.

Disconnect Switch

The provision of a disconnect switch 70 is optional in the remote unit 34 of the present invention. However, the disconnect switch 70 provides valuable features when used in the tampering detect sequence described hereafter. The disconnect switch 70 may also be remotely controlled by the central utility site 10 to control the power at a particular customer site.

The disconnect switch 70 can be of conventional construction in that it includes two switchable contacts, which are adapted to be respectively connected between one line and one load blade terminal, such as blade terminals 54 and 58 and 56 and 60.

To this end, the disconnect switch 70 is provided with a pair of line terminals 72 and 74 which project outwardly from one side of the housing of the disconnect switch 70 and a pair of load terminals 76 and 78 which project from an opposite edge or surface on the disconnect switch 70. The terminals 72 and 74 are adapted to be disposed in registry with the load blade terminals 54 and 56 extending through the base wall 42. Suitable fasteners, such as rivets, are employed to securely and electrically connect the terminals 72 and 74 to the load blade terminals 54 and 56, respectively. Likewise, the load terminals 74 and 78 are disposed in proximity with the load blade terminals 58 and 60 and are secured thereto by means of suitable fasteners as described above. In this manner, the disconnect switch 70 can be easily mounted in the base 42 without interfering with the circuit board 66.

Although the disconnect switch blade terminals 72, 74, 76 and 78 have been described as being separate from the blade terminals 54, 56, 58 and 60 in the base 40, it will be understood that the disconnect terminals 72, 74, 76 and 78 can be integrally formed as a one piece, unitary structure with the blade terminals 54, 56, 58 and 60 to form a generally L-shaped blade terminal projecting from the disconnect switch 70 which has an end portion, similar to the blade terminals 54, 56, 58 and 60, which is slidingly engagable through one of the apertures in the base wall 42.

Figure 11:
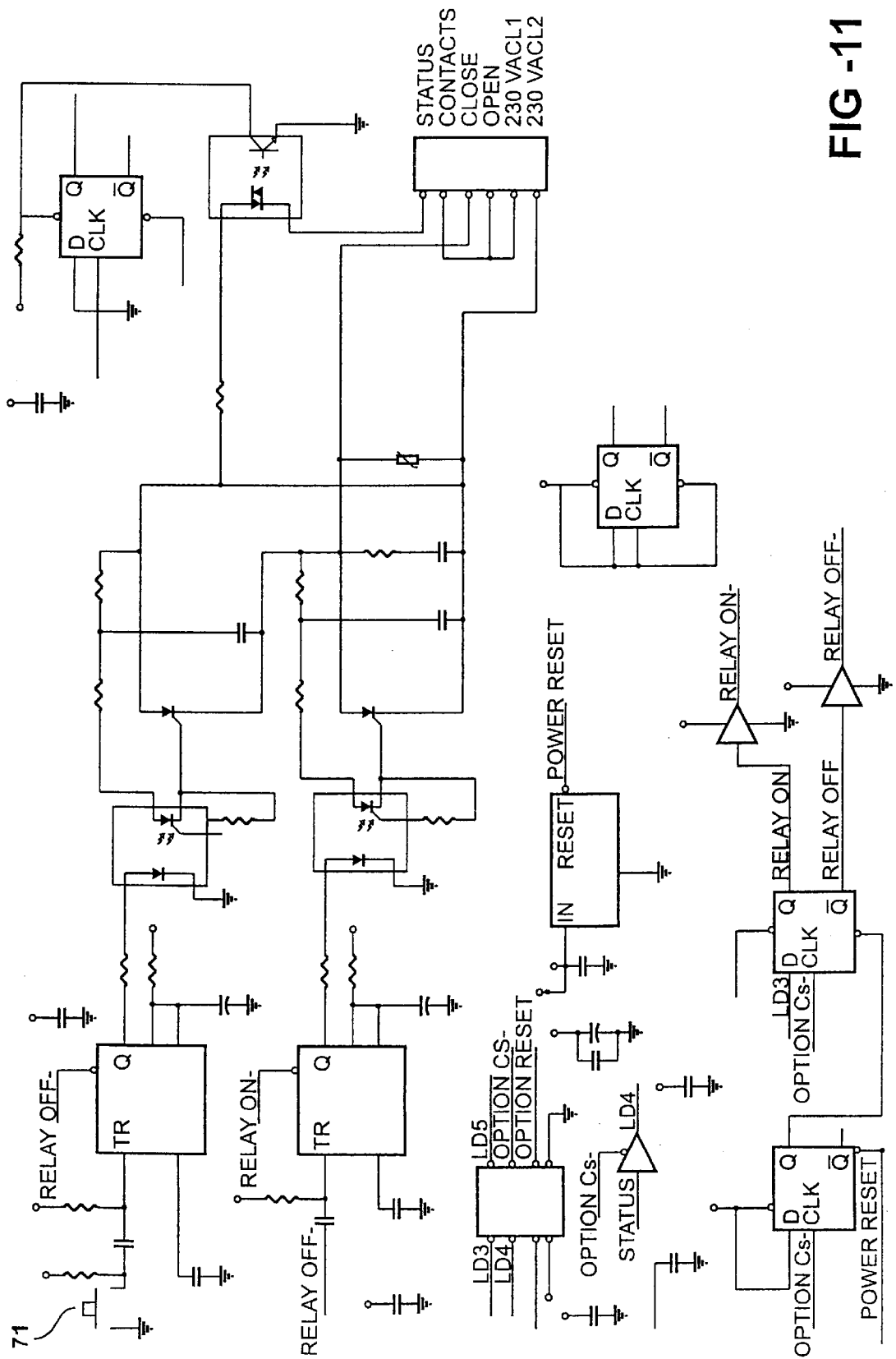
FIG. 11 is a schematic diagram of the disconnect switch control circuitry used with the optional disconnect switch shown in FIG. 4.

FIG. 11 depicts the control circuitry for the disconnect switch 70 which is mounted on a circuit board attached to the bottom surface of the circuit board 66 facing the disconnect switch 70. The disconnect switch control circuitry includes a pair of flip-flops which remember the state of an internal relay in the disconnect switch 70. The flip-flops enable the disconnect switch 70 contacts to be switched to the last state after power is reapplied to the remote unit 34 after a power interruption, removal of the remote unit 34 from the meter socket 30, etc.

The disconnect switch 70 may be controlled by a signal from the central site 10 to either "on" or "off" states as dictated by the electric utility. The signal will be received by the circuit and cause the flip-flops to switch states in accordance with the on or off signal. At the same time, a push button 71, shown in FIG. 11, is mounted at a convenient location on the shell 44 and the base 42 to enable a customer, after receiving appropriate instructions from the electric utility, to manually reset the disconnect switch 70 to the "on" state.

Remote Unit Circuitry

A general block diagram and the circuitry of the major components of the remote unit 34 which are mounted in the base 40 at each utility customer site 18 is shown in FIGS. 7, 8A–8D and 19. The circuit includes a power supply 122, voltage and current sensing circuit, an analog to digital conversion circuit 124, a central processing unit and associated logic 126, memories 128 and 129, a telephone communication modem 130, an opto-communication port 254, and a clock. The details of these major components will now be described.

As is conventional, the electrical power distribution network 16 from the central utility company generating site typically carries 240 VAC. A single-phase, three-wire power distribution network 16 is shown in FIGS. 1 and 2 with three wires connected to the electrical power distribution network 16 at each utility customer site 18. Each line 134 and 136 carries 120 VAC RMS with respect to neutral or ground wire.

Figure 8A:
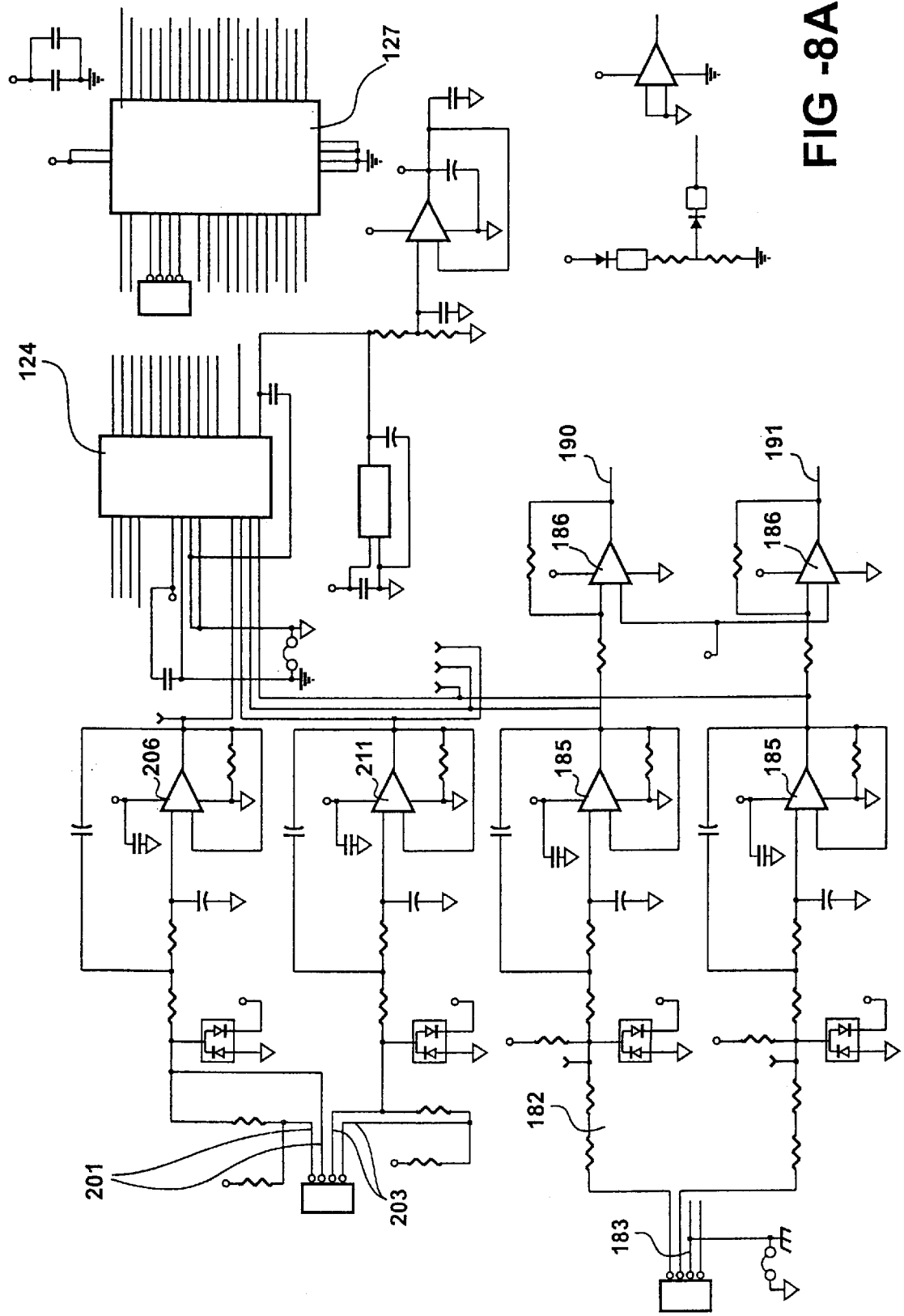
FIGS. 8A, 8B, 8C, and 8D are detailed schematic diagrams of the circuitry of the electric energy management apparatus mounted on the circuit board shown in FIGS. 5 and 6.
Figure 8B:
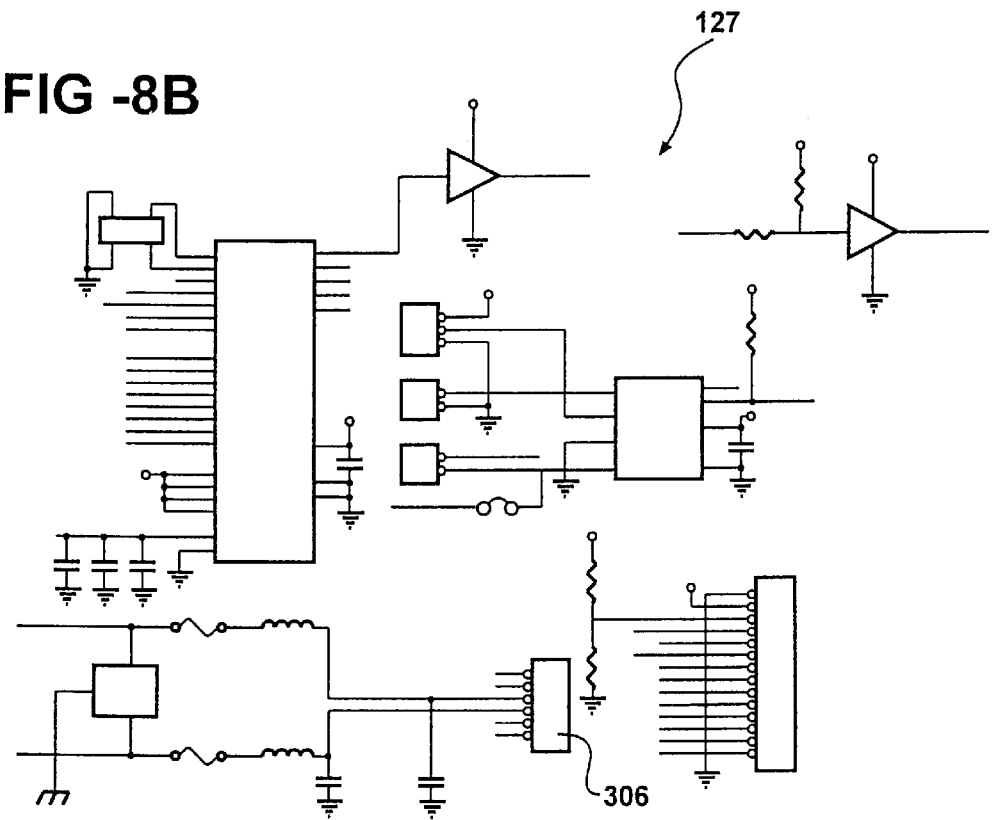
Figure 8C:
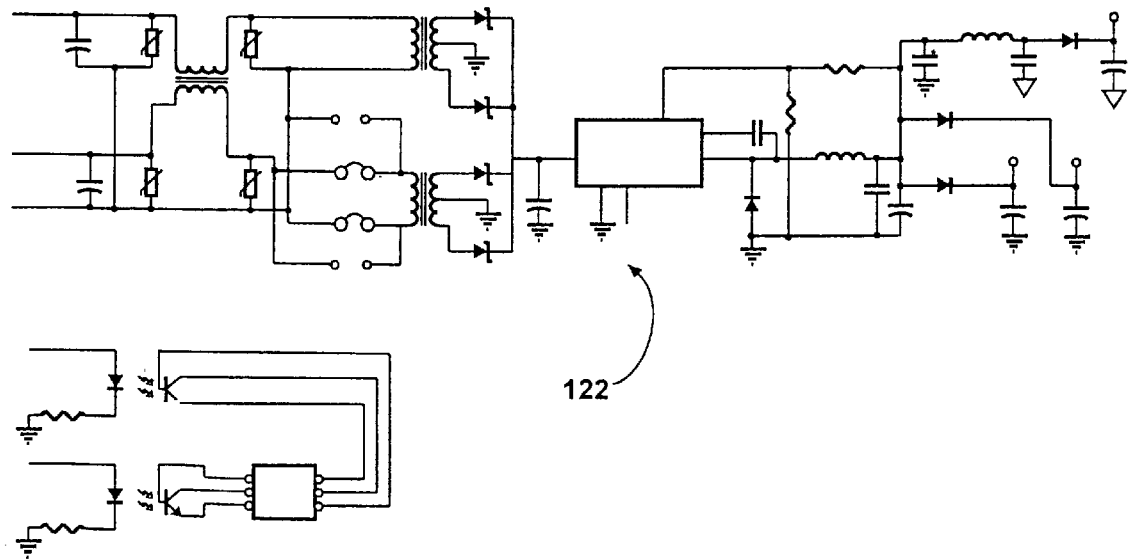

The power supply 122, shown in FIG. 8C, provides regulated, low level DC power at the preferred ±DC levels required by the electronic components used in the circuit 120.

The circuit 120 also includes a voltage sensing network denoted in general by reference number 180 in FIG. 8A. The voltage sensing network receives 120 VAC RMS 60 Hz input from the utility lines. One set of voltage inputs including voltage lead line connections 182 and 183 are between one lead line and neutral; while the other pair of inputs 184 and 183 is between the other lead line conductor and neutral. The voltage lead 182 is input to a combination of series connected, differential amplifiers 185, 186 which have a settable gain of $\frac{1}{100}$, for example. The output of the differential amplifiers is input to an A/D converter 124. The other line connection 184 is input to a similar combination of differential amplifiers thereby resulting in two separate voltage inputs as shown by reference numbers 190 and 191 in FIG. 8A which are connected to other inputs of the A/D converter 124. The differential amplifiers 186 provide an instantaneous voltage corresponding to the lead line voltage present on the conductors 182, 183 and 184 which is within the input range of the A/D converter 124. It should be understood that the input voltages supplied to the A/D converter 124 are instantaneous voltages.

The current sensing network of the circuit 120 includes first and second current transformers 200 and 202, respectively, as shown in FIGS. 3-5. The current transformers 200 and 202 each include a high permeability toroid which is disposed around a circular wall 199 surrounding each of the line blade terminals 54 and 56, respectively, in the base 40. The circular wall 199 is preferably a continuous or discontinuous annular member or members which are fixedly disposed on the base 40. Preferably, the wall 199 is integrally formed with and extends from the plane of the base 40.

The walls 199 provide a center support for the toroidal current transformers 200 and 202 to fixedly mount the current transformers 200 and 202 on the base 40. This fixes the position of the current transformers 200 and 202 with respect to the inner disposed blade terminals 54 and 56, respectively. Once the meter is calibrated, the magnetic flux between of the current transformers 200 and 202 and the current flowing through the blade terminals 54 and 56 remains fixed thereby increasing the accuracy of the electric power measurement of the meter as compared to prior art automatic meter reader devices in which the current transformers are not held in a fixed position and are capable of movement with respect to the blade terminals.

The current transformers 200 and 202 are precision, temperature stable transformers which provide a ±10 volt output voltage signal in proportion to the instantaneous current flowing through the line conductor. The electrical conductive coil of each current transformer 200 and 202 maybe covered by a protective insulating coating, with the conductive coil leads or outputs extending therefrom.

The outputs 201 from the current transformer 200 are input through a conditioning circuit to an amplifier 206. The output of the differential amplifier 206, which represents the scaled instantaneous current in the line conductor 134, is supplied as an input to the A/D converter 124 as shown in FIG. 8A.

A similar signal conditioning circuit is provided for the current transformer 202. The output leads 203 from the current transformer 202 are supplied to a differential amplifier 211. The output of the differential amplifier 211 is also supplied as a separate input to the A/D converter 124.

The A/D converter 124 includes internal sample and hold circuits to store continuous voltage and current signal representations before transmitting such instantaneous voltage and current representations to other portions of the circuit 120, as described hereafter.

The twelve bit output from the A/D converter 124 is connected to an electronic programmable logic device (EPLD) 127, shown in FIG. 8A, which stores the instantaneous line voltages and currents and performs at least an initial kilowatt hour (KwH) calculation at the sample rate of the A/D converter 124 on each link. This gives a real time, dual channel power measurement since the power on each separate 120 VAC line and on the 240 VAC line is separately calculated. This avoids the averaging employed in prior power metering devices and provides greater power measurement accuracy.

The individual line voltages and currents as well as the calculated KwH are accumulated for a predetermined time period, before the data is transmitted through a high speed data bus to a central processing unit 126. The central processing unit 126, in a preferred embodiment which will be described hereafter by way of example only, is a 16 bit microcontroller, Model No. AMI86ES, sold by Analog Devices. The microcontroller 126 executes a control program stored in the flash memory 128, or backup EEPROM memory 129, as described hereafter, to control the operation of the circuit 120. Clock signals from a real time clock circuit 127, in FIG. 8B, are supplied to the processing unit 126 and other circuit elements.

The microcontroller 126 also drives a display means 222, such as a liquid crystal display, for consecutively displaying for a brief time interval, for example, the total kilowatt hours (KwH) total KVA total and KVA reactive, date, time, individual line current and voltage, and average power factor. The display 222 can be mounted, for example, at a suitable location on the circuit board 66, for easy visibility through the transparent cover 57 mounted in the end wall of the shelf 44. The display 222, in a preferred embodiment, contains 16 characters divided into significant digits and decimal digits.

Figure 9A:
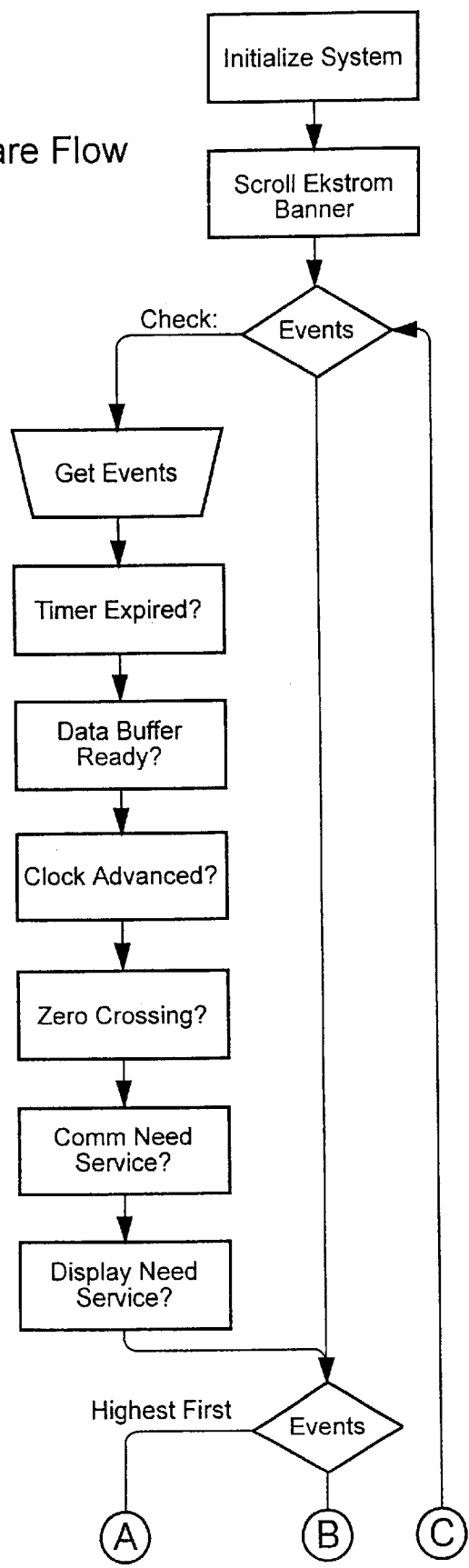
FIGS. 9A and 9B are flow diagrams of the electric energy management apparatus control program.
Figure 9B:
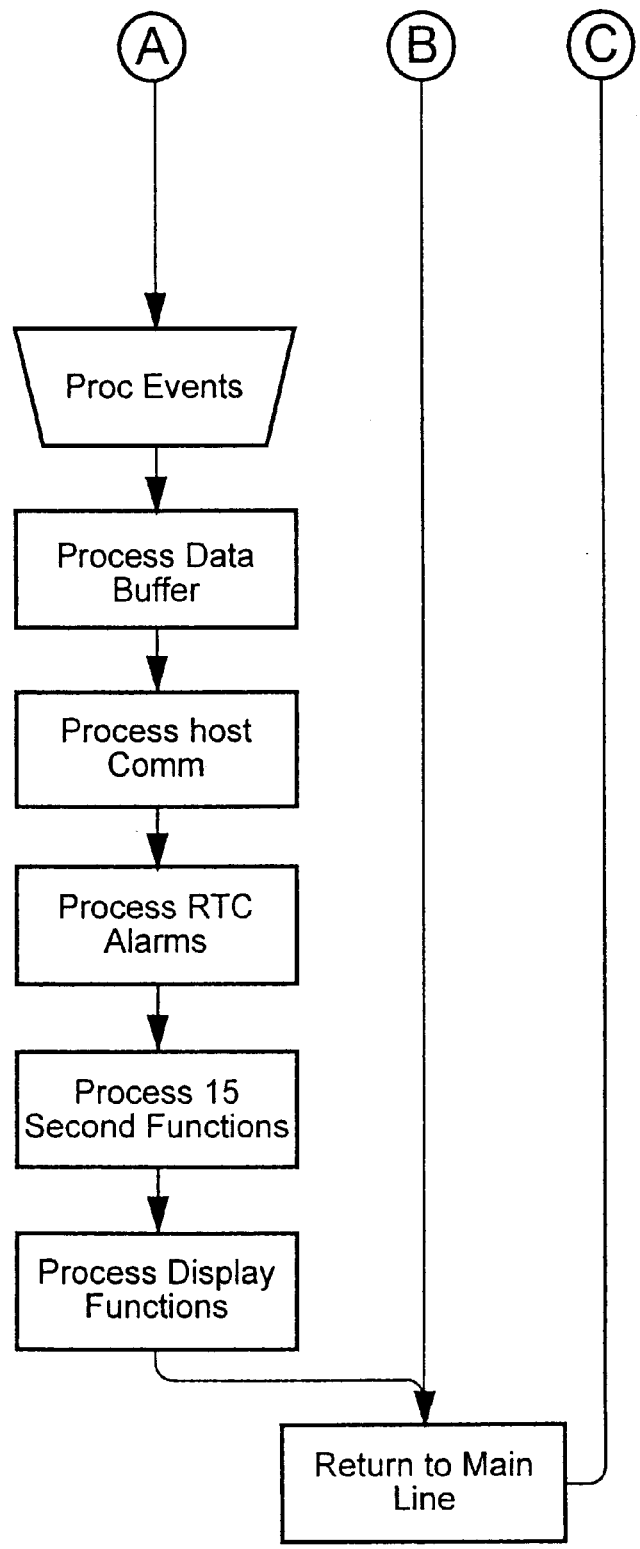

Referring now to FIGS. 9A and 9B, there is depicted a flow diagram of the sequence of operation of the control program executed by the CPU 126. After initialization, the CPU 126 executes a number of steps to initialize various registers and to set up to receive voltage and current data. Maintenance routines are also executed to determine if any of the components, such as the communication channels, the display 226, etc., need service. If any maintenance or time event, such as a zero crossing of the voltage or current waveforms is detected, the CPU 126 executes the detected event step in a priority order from high to low as shown in FIG. 9B which depicts an exemplary priority order of event processing.

Tamper Detection

The remote unit 34 of the present invention is provided with a unique tamper detection circuit which not only detects at least one or more different types of tamper events; but is capable of recording the time of day and the total duration of the tamper event as well as optionally taking action such as switching the disconnect switch 70 to an open condition thereby preventing any further application of electric power through the disconnect switch 70 to the customer site 18, 19 when the remote unit 34 is reinserted into the socket 30.

The base 40 of the remote unit 34 is provided with at least one and, preferably, two ground tabs 51, one being shown in FIG. 3, which extend radially along the back surface of the base wall 42 into one of the notches 50 on the flange 48 surrounding the base wall 42. Each ground tab 51 is positioned to engage a ground connection in the socket 30 to complete a ground circuit from the remote unit 34 through the socket 30 to earth ground.

The tamper detection sequence of the present invention is based on the mounting relationship of the blade terminals 54, 56, 58 and 60 in the jaw contacts 32 in the socket 30 and the connection between the ground tabs 51 and the mating ground tabs in the socket 30. In addition, the voltage and currents of each of the two legs or phases of power supply to a customer use site 18 as well as the voltage and current of the center ground or neutral connection are continuously monitored as part of the tamper detection.

Figure 15:
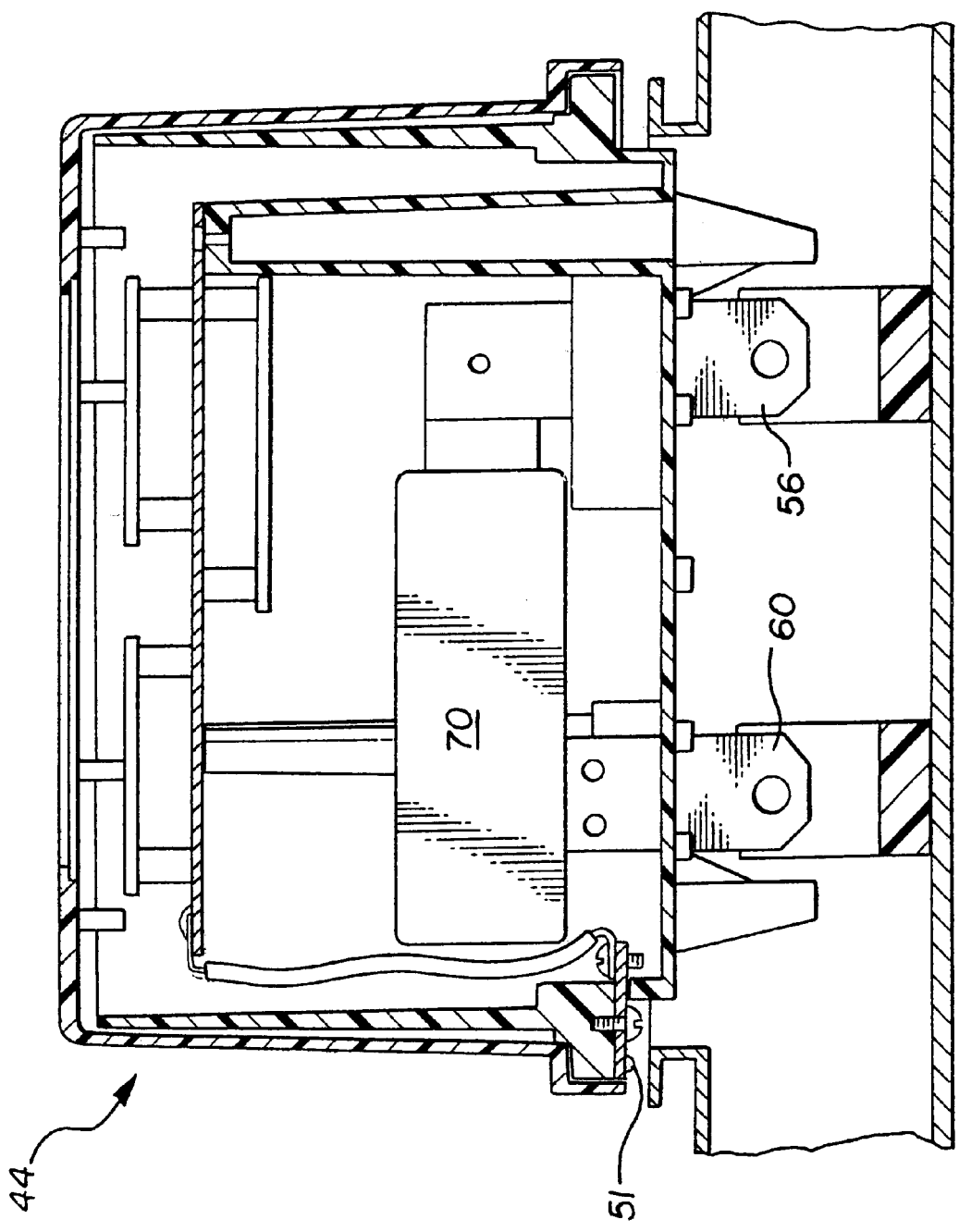
FIG. 15 is a side elevational view of the electric energy management apparatus depicting a partially removed position of the housing from the meter socket.
Figure 16:
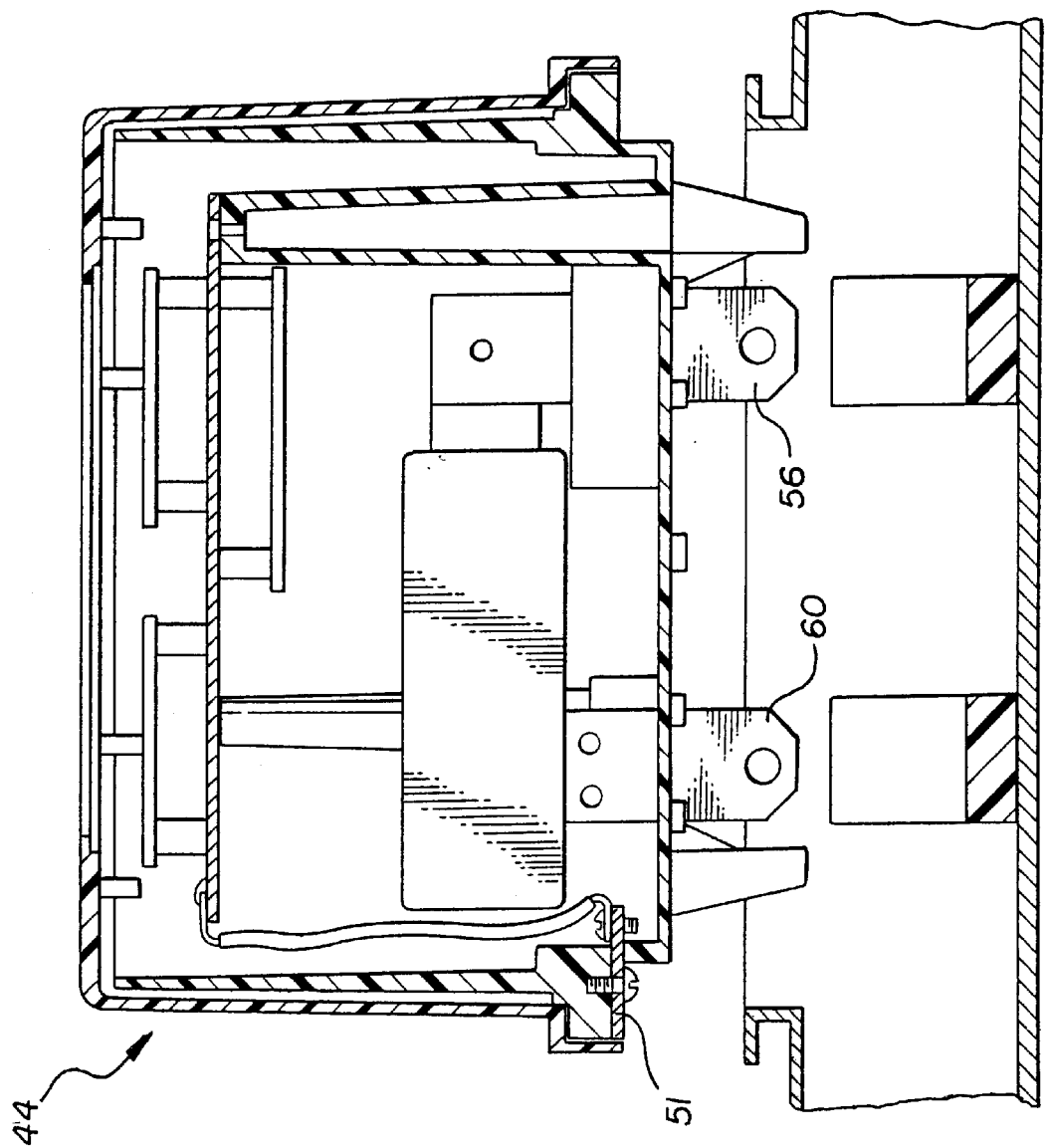
FIG. 16 is a side elevational view, similar to FIG. 15, but showing the housing blade terminals in a fully separated position with respect to the socket jaw contacts.
Figure 17:
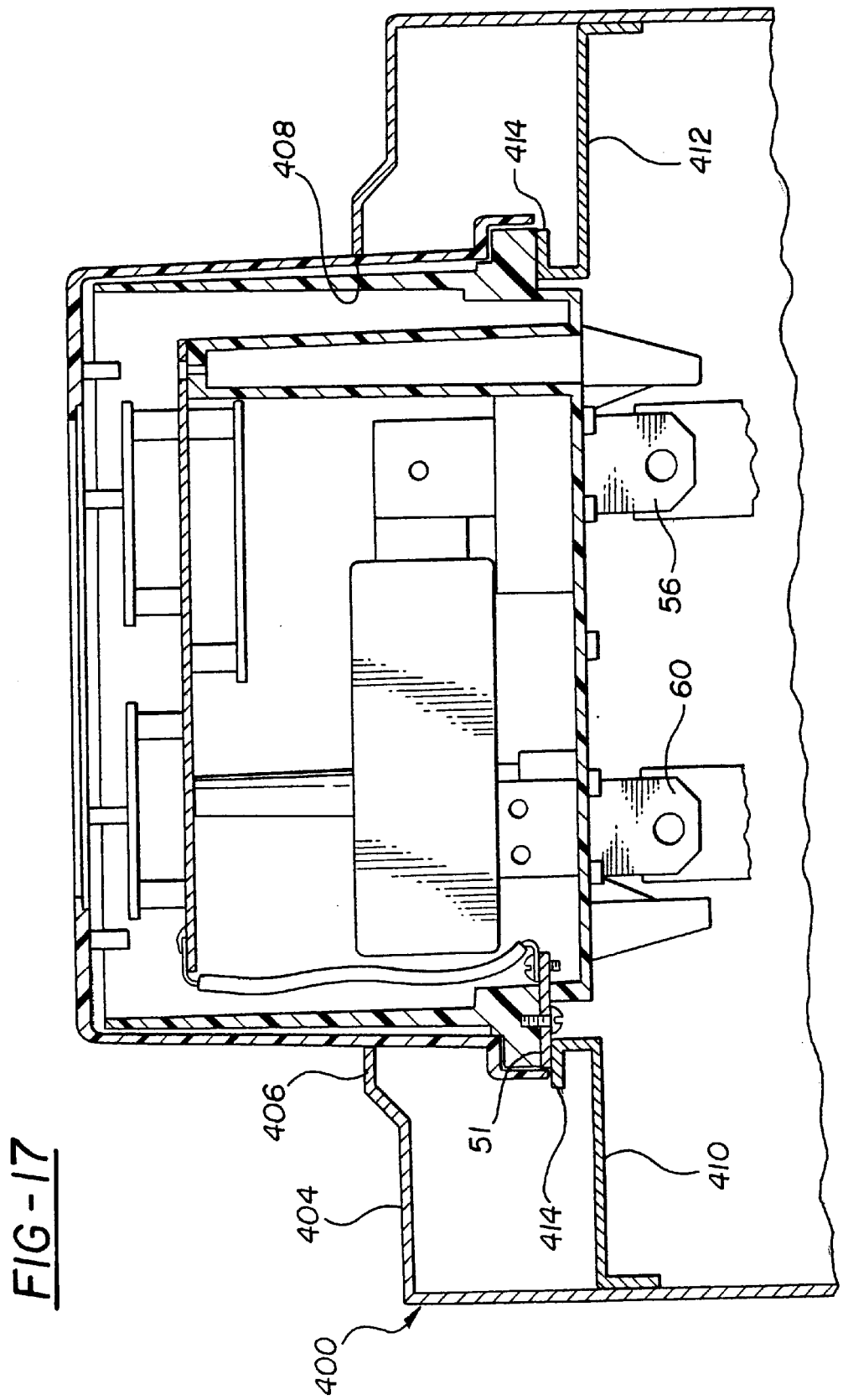
FIG. 17 is a side elevational view of a meter installation depicting the electric energy measurement apparatus of the present invention mounted in a ringless style meter socket.

Since the blade terminals 54, 56, 58 and 60 extend a distance, such as approximately ½ inch, into the jaw contacts 32 in the socket 30 when in the full mounted position shown in FIG. 5, any attempt to remove the remote unit 34 from the socket 30 will initially cause the ground tab 51 to separate from the mating ground tab in the socket 30 in a timed sequence before the blade terminals 54, 56, 58 and 60 completely separate from the respective jaw contacts 32 and shown in FIGS. 15 and 16.

In a normal operating state when the remote unit 34 is securely mounted in the socket 30, the voltage on the first and second legs will equal approximately 120 VAC, and the voltage and current on the ground leg will be zero. The current in the first and second legs will be greater than zero.

During a tamper event when the remote unit 34 is initially pulled from the socket 30, as shown in FIG. 15, the ground tab 51 will separate from the mating ground connection member in the socket 30. At this time, the ground current will equal zero while the voltage of the ground line will be greater than zero due to the loss of ground connection. However, the blade terminals 54, 56, 58 and 60 are still connected to the socket jaw contacts 32 such that current continues to flow through the first and second legs, i.e., $i_{L1}$ and $i_{L2}>0$. Continued separation of the remote unit 34 from the socket jaws 32 will eventually completely separate the blade terminals 54, 56, 68 and 60 from the socket jaw contacts 32, as shown in FIG. 16, such that the current flowing through the first and second legs will drop to zero.

This defines the tamper signature detected by the remote unit 34 of the present invention. Specifically, the tamper signature is the detection of a time delay between the time that the ground current equals zero and a ground voltage is greater than zero and a subsequent time occurrence of at least one of the first and second line and load currents equaling zero. In the case of a power outage, the ground voltage will not be greater than zero, so as to not constitute the tamper signature.

Figure 14:
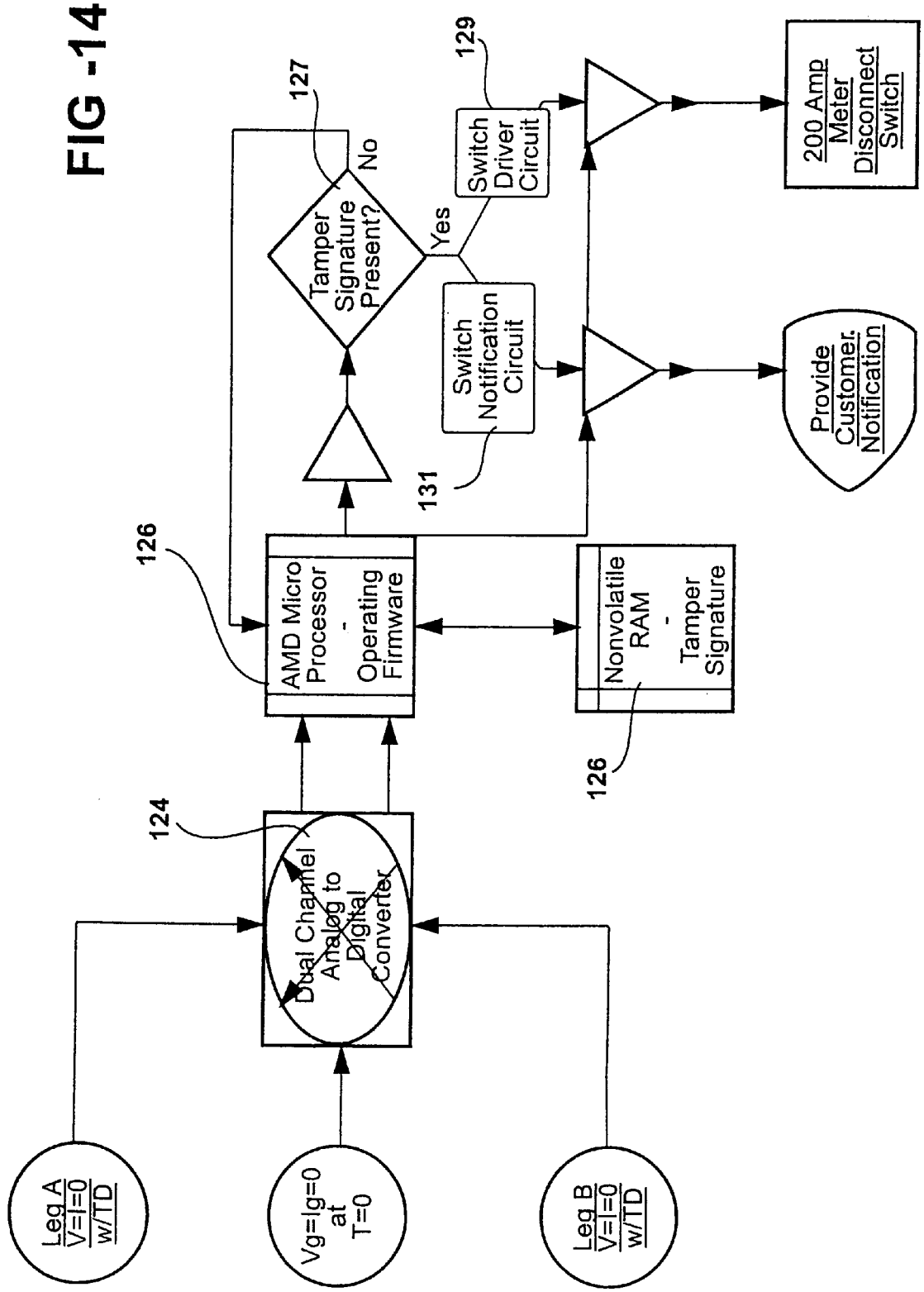
FIG. 14 is a flow diagram depicting the tamper detection sequence.

This sequence is depicted in FIG. 14. The microprocessor, after detecting a tamper signature in step 127 will generate and send a signal, labeled "tamper" in FIG. 8B, to the disconnect switch 70 which will cause the disconnect switch 70 to switch or remain in an open position the next time electric power is supplied to the disconnect switch 70 through the blade terminals. This signal is shown by reference number 129. The CPU 126 also generates a notification signal 131 which can be transmitted back to the central site 10 to indicated to the utility that a tamper event has occurred. If the utility company chooses to contact the customer at the customer site at which a tamper event was detected, the utility company can notify the customer that tampering has been detected and provide the customer with the time of the start of the tamper detection as well as the total duration of the tamper event. Corrective action can now be easily taken by the utility to address the tamper event.

Upon reconnecting power to the offending customer site, the central site 10 can send a signal through the communication network described hereafter, to the customer site to set up the disconnect switch circuitry to reapply power to the disconnect switch 70 after the customer pushes pushbutton 71 on the remote unit 34. This will cause the disconnect switch 70 contacts to switch to the closed state thereby reconnecting a circuit between the line and load blade terminals in the remote unit 34.

The signal 131 also contains data relating to the time and date of the start of the detected tamper signature event as well as the time duration of the tamper event. The time and date of the start of the tamper event as well as the duration of the each detected tamper event can be stored in the memory of the remote unit 34 for later transmission to the central site 10 for tamper event recordation, analysis, etc.

Instead of a control program consisting of software instructions executed by a microprocessor, the above described tamper event detection method can also be implemented in a dedicated electronic circuit formed of electric current and voltage sensors and logic elements which can sense the line and ground circuit voltages and currents as well as a time separation between certain voltages and currents as described above. The outputs of such a circuit can be the "tamper" signal which can be transmitted by various means, such as power line communication, Rf communication, etc., to a central site 10. The "tamper" signal can be applied directly to the disconnect switch 70 to automatically disconnect the supply of electric power to the meter site at which a tamper event has been detected.

Figure 18:
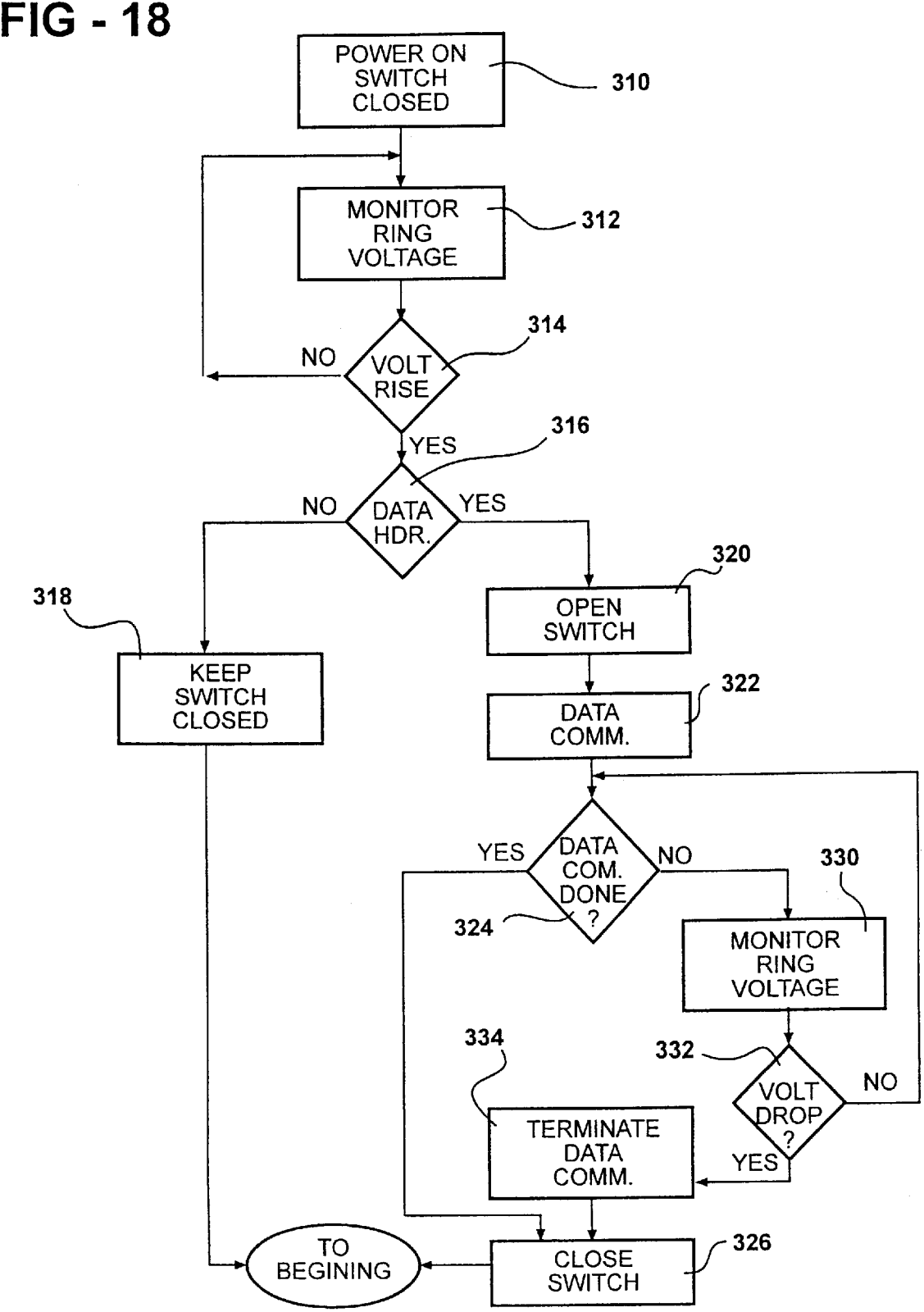
FIG. 18 is a flow diagram of the telephone interrupt and non-interrupt control sequence.
Figure 19:
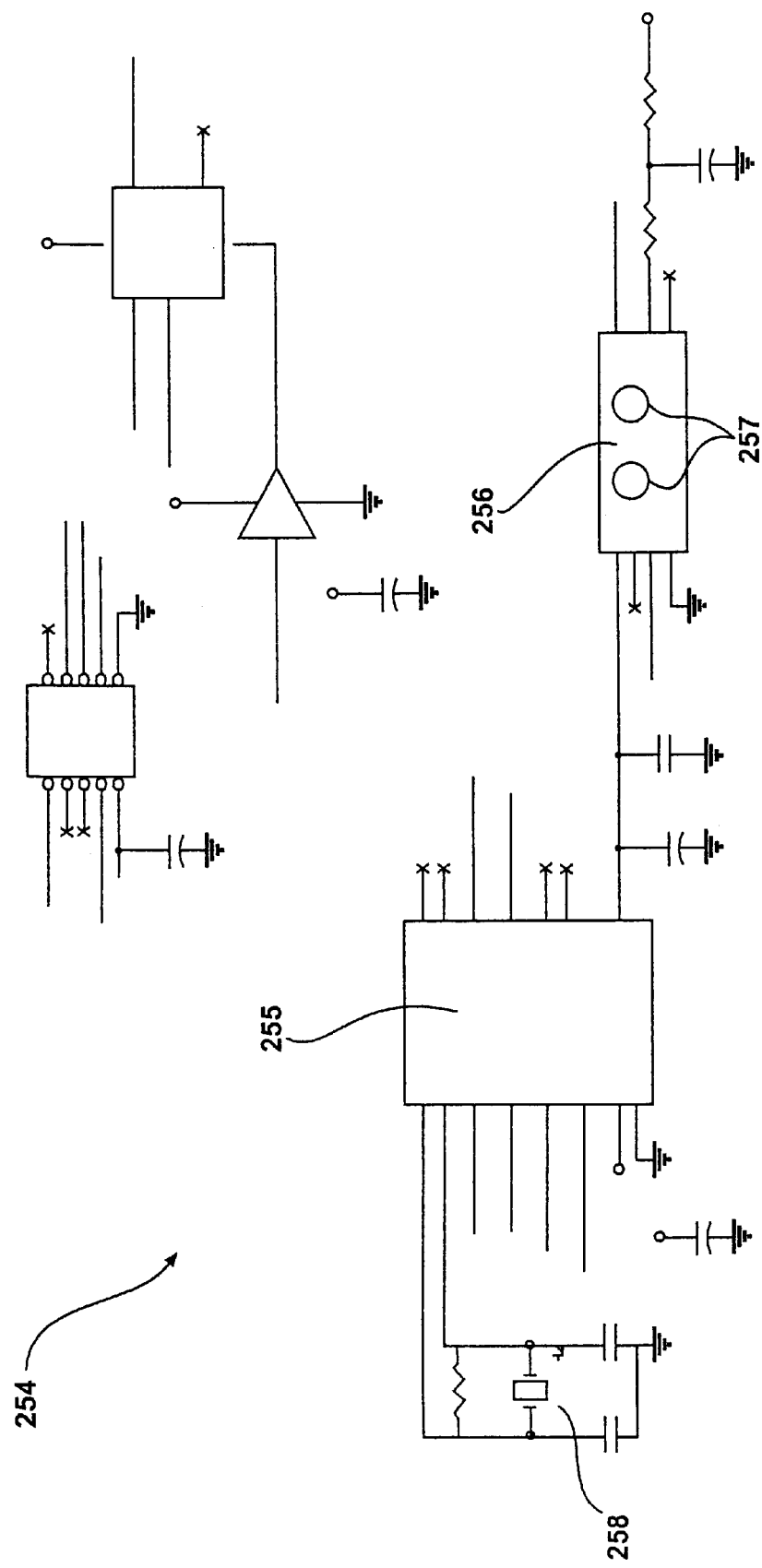
FIG. 19 is a diagram of the optical communication circuit.

In FIG. 18, the remote unit 34 of the present invention is shown mounted in a ringless style watthour meter socket 400 which includes a housing 402 and a cover 404. A raised annulus 406 is formed in the cover 404 surrounding an aperture 408 through which the sidewall of the remote unit 34 extends.

Inner disposed mounting brackets 410 and 412, which are fixedly mounted on the sidewalls of the socket housing 402, extend inward to an inner flange end 414. The inner flange end 414 is positioned to engage one of the ground tabs 51 extending radially outward on opposite diametric sides of the housing of the remote unit 34. This completes a ground circuit through the internal circuitry of the remote unit 34 and the earth ground connection in the meter socket 400.

The tamper event signature detection method and apparatus according to the present invention takes place in the same manner as that described above.

Remote Communications

A first communication feature of the remote unit 34 of the present invention is uninterruptible telephone service to the customer site 18. The remote unit 34 intercepts calls by TCP/IP modem interface circuitry that permits the remote unit 34 to answer incoming calls from the central site 40 without detection by the customer, and, additionally, a courtesy transfer feature that automatically disconnects the remote unit 34 from the telephone line and prepares the remote unit 34 for a later retry when the customer picks up the handset on the telephone during a communication between the remote unit 34 and the central site 10

The uninterruptible telephone service is achieved by connecting the TCP/IP modem interface circuit in series in the telephone(s) of the use site 18. In this manner, the remote unit 34 can recognize and intercept the ring circuit to receive or transmit data to the central site 10.

Initially, the CPU 126 detects a voltage rise before a voltage peak is reached in the ring circuit. The CPU 126 is programmed to recognize the TCP/IP data format from the central site 10. Upon detecting the TCP/IP format, the CPU 126 routes the incoming telephone call to the appropriate part of the remote unit circuitry 120 for processing and prevents the incoming call from reaching the customer's telephone thereby preventing ringing of the customer's telephone.

At the same time, the CPU 126 monitoring the ring circuit for a voltage drop which occurs when the customer picks up the handset of one of its telephones. Upon detecting the voltage drop, the CPU 126 immediately disconnects the telephone ring connection through the modem 130 and switches the connection to the customer's telephone thereby allowing the customer to make an outgoing call without interruption from the remote unit 34.

Referring now to FIG. 18, there is depicted the control program sequence for operation of the remote communication interface to the remote unit 34 and telephone service to the customer site 18.

Figure 8D:
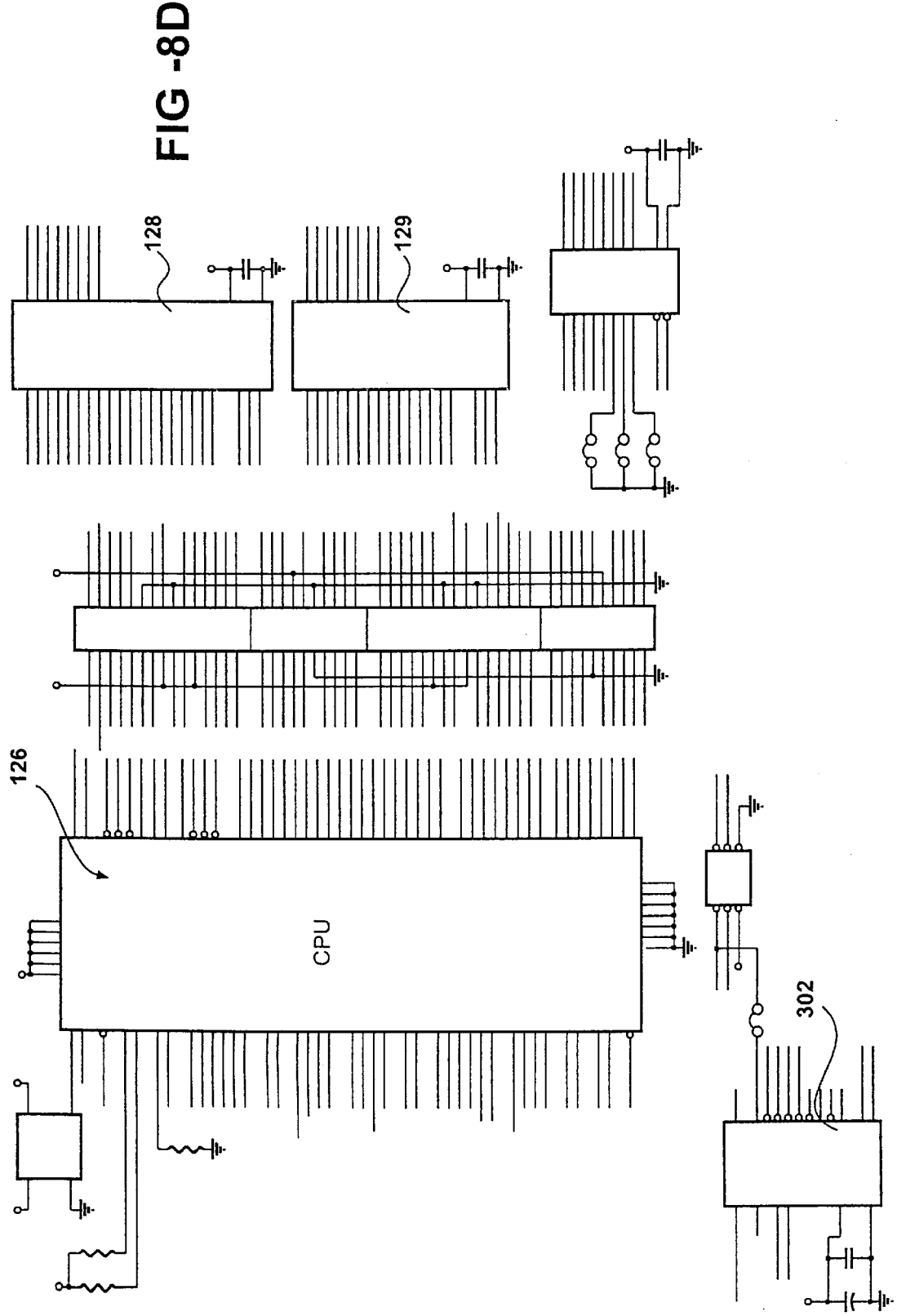

As shown in FIGS. 1 and 8D, the customer site 18 is provided with a switch 300 which is embodied internally within a programmable modem circuit 302 shown in FIG. 8D. The programmable modem 302 executes a firmware control program which maintains the switch 300 in the normally closed position for normal telephone communication on the telephone network conductors to and from the customer's telephone(s) 304.

As shown in FIG. 8B, the tip and ring conductors of the telephone network are connected to a header or jack 306 which provides input connections to the modem 302 as shown in FIG. 8D. The switch 300, shown in a pictorial representation in FIG. 1, is normally closed thereby providing a connection of the tip and ring circuits on leads 308 to the customer's telephone 304. This is embodied in control step 310 in FIG. 18.

The modem 302 is programmed to continuously monitor the ring voltage in step 312 to detect a voltage rise from the nominal ring voltage associated with a non-call condition. Such a voltage rise is an indication of an incoming telephone call on the ring conductor. Upon detecting a voltage rise in the ring conductor or circuit in step 314, the modem 302 then looks at the following data signals to detect a communication signal header format indicating a data communication signal from the central site 10. As noted above, this communication format can be the standard Internet TCP/IP communication protocol.

If the data communication header format is not detected in step 316 following a detection of a voltage rise in step 314, the modem 302 maintains the switch 300 in a closed position as shown in step 318 thereby allowing the normal incoming telephone call to be connected to the customer's telephone 304. This allows the customer to conduct a normal two-way telephone call without interference from the remote unit 34.

Alternately, if the modem 302 detects the data communication header format in step 316, the modem 302 opens the switch 300 in step 320 and establishes data communication between the central site 10 and the remote unit 34 in step 322.

The modem 302 continuously monitors the bidirectional data communication in step 324 to determine when the data communication is completed or finished. Upon completion of the data communication exchange, the modem 302 will reclose the switch 300 in step 326.

As shown in FIG. 18, continuously during the data communication sequence, the modem 302 monitors the ring voltage which has previously risen to a voltage peak during a telephone or data communication. If the customer picks up the handset of the telephone 304 during the data communication sequence, the ring voltage will drop. The modem 302, by continuously monitoring the ring voltage in step 330 will detect the voltage drop from the voltage peak in step 332. Immediately upon detecting a voltage drop in step 332, the modem 302 terminates the data communication between the remote unit 34 and the central site 10 in step 334 and recloses the switch 300 in step 326 to enable the customer to complete the telephone call.

The remote unit CPU will store a flag indicating that data communication was interrupted and will restart or reconnect the remote unit 34 with the central site at a later time or date to complete the data communication sequence which was interrupted.

The same non-interruptible telephone service to the customer also applies when the processing unit 126 initiates a data communication to the central site 10. The modem 302 will initiate a telephone call which will drive the ring voltage to a high voltage level. The processor in the modem 302 will continuously monitor the ring voltage during the data communication to and from the central site 10 to detect a voltage drop which will occur if the customer picks up the handset of the telephone 304. In a manner similar to steps 330, 332, 334, and 336 in FIG. 18 and described above, the processor in the modem 302 will immediately terminate data communication and reclose the switch 300 to enable the customer to complete a telephone call in a normal, non-interrupted manner. The processor of the modem 302 can supply a signal or flag to the processor 126 in the automatic meter reader 34 to indicate that data communication was interrupted. The automatic meter reader 34 will, at a later program time, reinitiate data communication to the central unit to retransmit all stored power values.

Another communication feature is the use of global network communications via TCP/IP protocol through the modem 302. This enables each remote customer site 18, 19, etc., to exchange data with the central utility site 10 over a global network, such as the Internet 21, in digitally encoded TCP/IP protocol at random time based intervals. The communication is two-way frequency programmable as well as duration programmable to permit communication flexibility. Each reader 34 will have an Internet address for unique communication with the central site 10.

The modem 302 at each customer use site as well as the modem in the central site 10 provides one way of connection to a global telecommunication network, such as the Internet or World Wide Web. It will be understood that other interfaces or connections to the global telecommunication network may also be employed, such as a direct cable connection, direct subscriber line connection, etc.

Another communication feature is wireless communication via a cordless or wireless optical communications port 254. An optical receiver, preferably an infrared receiver (IR) in the form of a pair of photodiodes or LED's 257 is mounted on the circuit board 66 and has a field of view through transparent cover 57 to receive optical or infrared signals from a wireless infrared programmer, not shown. The infrared programmer can be a hand held unit, computer lap top, or computer integrated infrared wand having an IR transmitter to enable a utility service person to program, upload and download information, connect and disconnect service via the disconnect switch 70, and instantaneously obtain customer load profile, use and service interruption data.

The photodiodes 257 are mounted on an integrated circuit 256 which carries connections to the ASIC circuit 255 for controlling the transmit and receive data communication through the photodiodes 257 at a clock rate established by a crystal oscillator 258 input to the ASIC circuit 255. Input and output leads are connected between the ASIC circuit 255 and the central processor 126. The CPU 126, under stored program control, is capable of receiving and decoding input signals received by the photodiodes 257 as well as transmitting data in the desired format through one of the photodiodes 257 to the external programmer.

The unique wireless communications port simplifies the construction of the remote unit 34 since a plug connection to an external programmer, as previously required, is no longer necessary.

Out-of-Spec Power

As described above, an electric utility is required to deliver electrical power, particularly the voltage of such power, within a specified range of maximum and/or minimum voltages. For example, the supplied voltage cannot exceed 120 VAC RMS or be below 114 VAC RMS.

Figure 12:
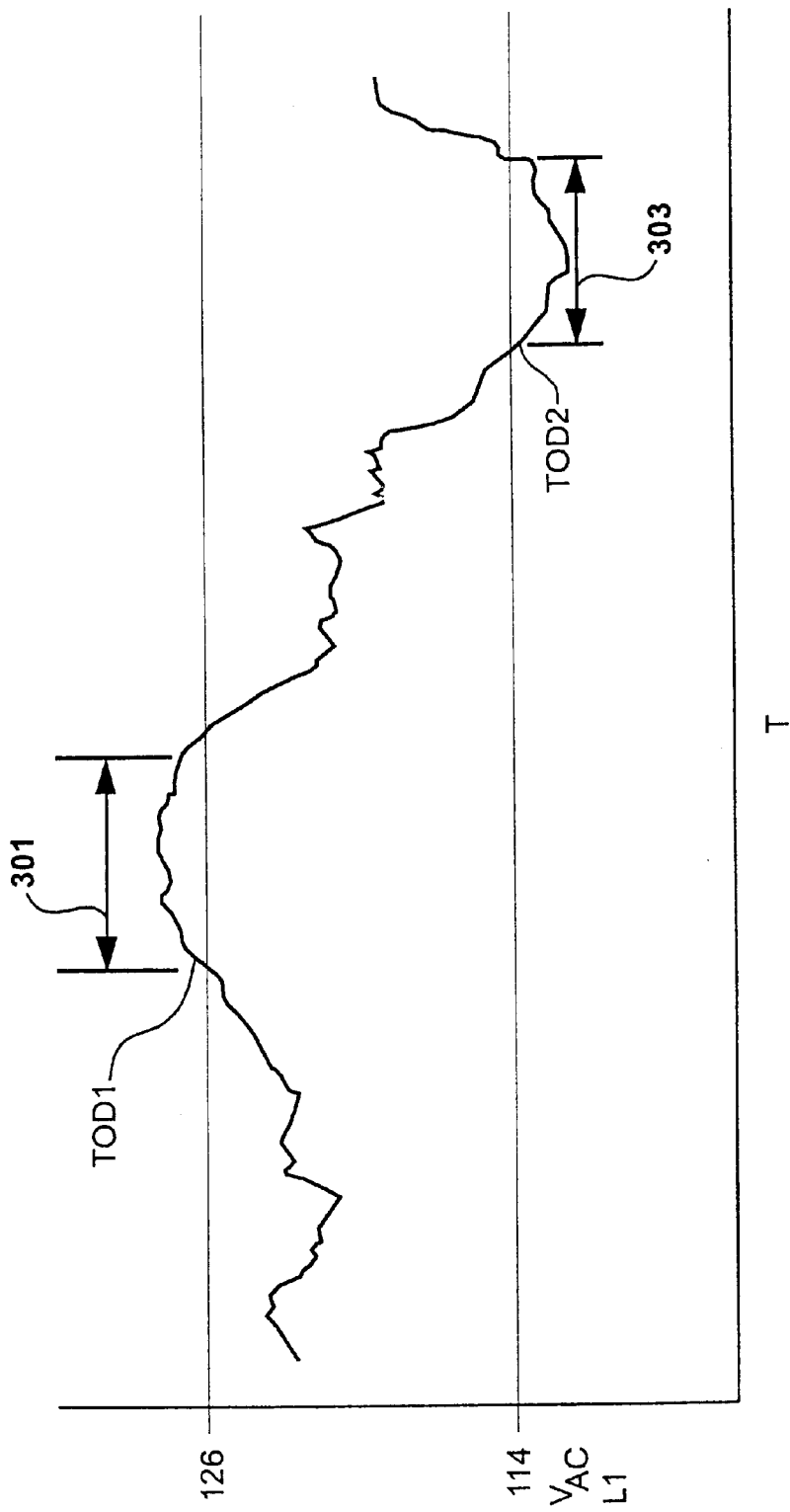
FIG. 12 is a graph depicting out-of-specification voltages.

FIG. 12 depicts an exemplary voltage versus time waveform of electrical power supplied to customer site 18. TOD1 depicts the start of an out of range voltage excursion on leg or phase one of the electric power delivered to the customer use site 18. The remote unit 34 detects the out of range excursion of the instantaneous voltage on leg one beyond the high voltage limit, and stores the time of day (TOD1) of the beginning of the out-of-spec voltage excursion as well as of the duration 301, or the total length of time that the voltage is out-of-spec. This time duration is converted to kilowatt hours in real time as shown in FIG. 13 to provide an indication of the amount of out-of-spec power which was delivered to a particular use site.

FIG. 12 also depicts a low voltage out-of-spec excursion. The start time TOD2 and the duration 303 of this excursion are also detected and stored in the memory of the remote unit 34 and the kilowatt hours of low "out-of-spec" voltage is determined. In this manner, a utility can determine whether or not electric power was delivered to a particular use site outside of the required range.

Figure 13:
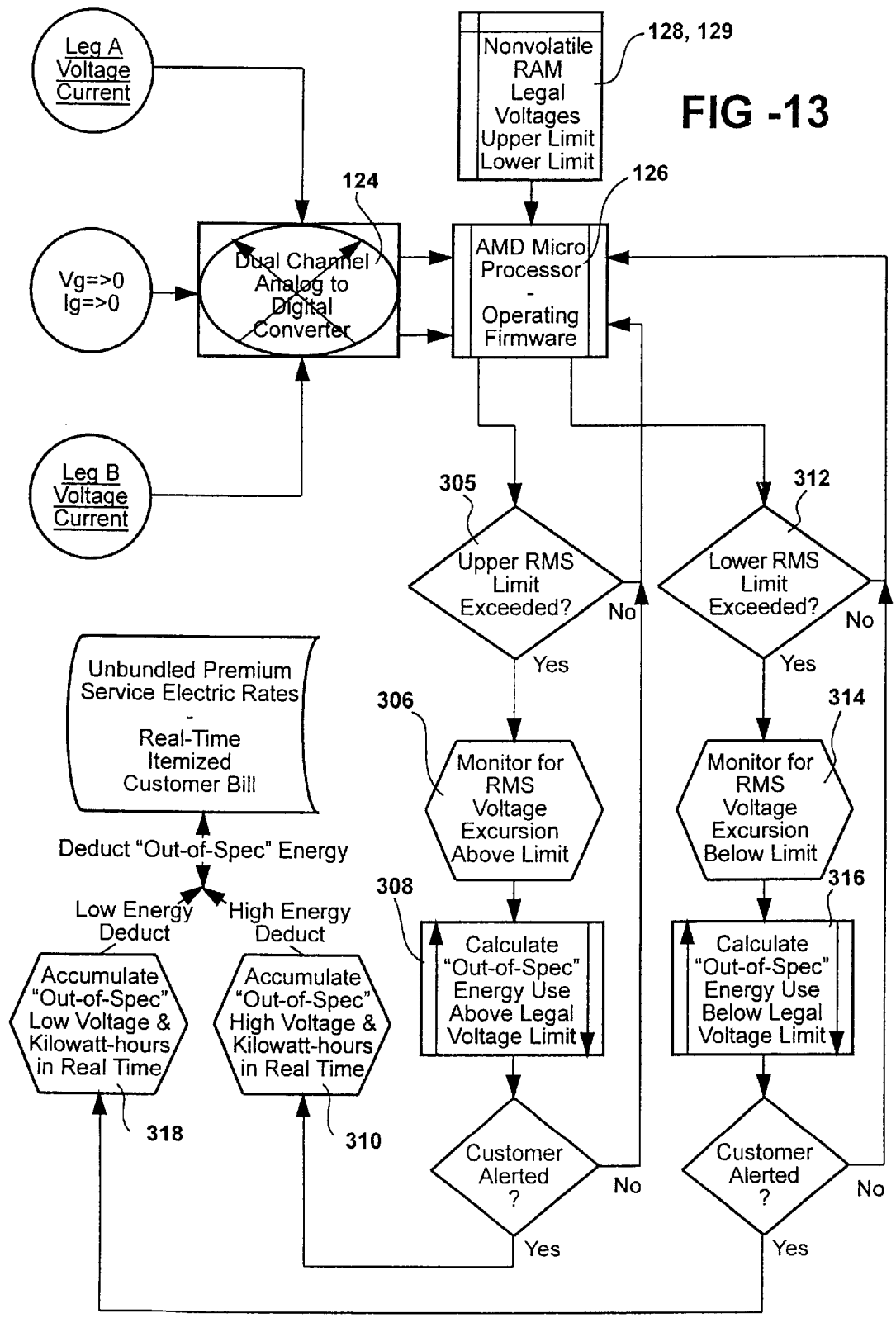
FIG. 13 is a flow diagram of the "out-of-spec" energy detection sequence.

As shown in FIG. 13, when a upper RMS voltage limit is exceeded on any of the lines in step 305, the CPU 126 monitors the RMS voltage for the duration of the upper limit excursion in step 306. The CPU 126 via the EPLD 27 calculates the "out-of-spec" energy use during the upper limit excursion in step 308. This "out-of-spec" energy use is accumulated in kilowatt hours in real time in step 310. A similar sequence is used when the lower voltage RMS limit is exceeded in step 312. As described above, the CPU 126 monitors the RMS voltage during the lower limit excursion in step 314 and calculates the total "out-of-spec" energy use in kilowatts below the legal voltage limit in step 316. The out-of-spec low voltage and kilowatt hours are accumulated in real time in step 318 for transmission to the cental site 10 for billing purposes.

Power Demand Windows

As describe above, the CPU 126 through the voltage and current detection circuitry 120 is capable of measuring and storing the instantaneous line voltages in the calculated KwH and other electric power parameters at each sample of the A/D converter 124.

The CPU 126 operates on a demand window concept wherein each 24 hour day is divided into a plurality of intervals of any predetermined duration, such as 15 minutes, 30 minutes, 45 minutes, 60 minutes, etc. In each interval, the total KwH, KAV, average phase angle, and peak voltage and current variables are calculated and stored in the memory 128. This data can be transmitted to the central site at any time upon receipt of an interrogation signal from the central site 10 or on a time sequence initiated by the remote unit 34.

This interval arrangement allows peak voltage and current excursions on any of the power lines at a customer site to be detected and reported. Previously, the average of the voltage and current supplied to a particular customer site were used thereby rendering the central utility incapable of detecting any peak voltages or currents.

Figure 10:
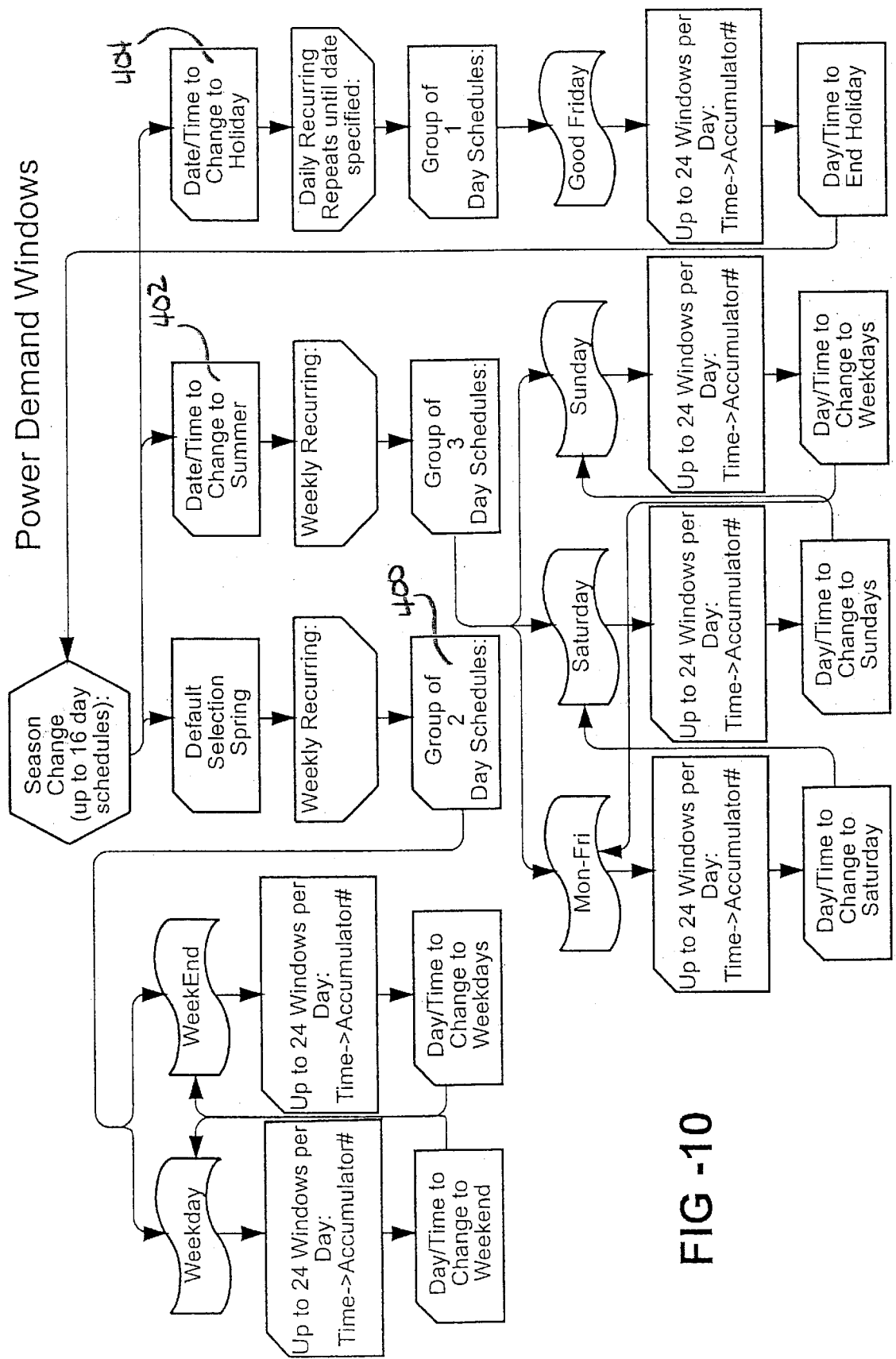
FIG. 10 is a flow diagram of the power demand windows control sequence of the present electric energy management apparatus.

As shown in FIG. 10, in order to provide different real time pricing for peak utility demand periods, week days, weekends, holidays, etc., the control program of the CPU 126 is provided with a plurality of discrete schedules, such as sixteen schedules by example only. Three of the schedules are shown in FIG. 10, again by example. The first schedule provides for regular time (non-daylight savings time) wherein the power usage data is stored and transmitted on a weekly basis. As shown in step 400, the weekly data storage can also be subdivided into two different day schedules, one for week days and one for weekends. Up to twenty four windows per day are provided for each day schedule. At the end of any day schedule time period, the CPU 126 automatically switches to the other day schedule.

Similarly, the CPU 126 is programmed to automatically switch to a daylight savings time schedule as shown in step 402. This can also be on a weekly recurring data reporting basis. This schedule is divided into three days schedules, by example only, covering the weekdays, (Monday–Friday), a separate Saturday schedule and a separate Sunday schedule. Each day schedule is subdivided into twenty four windows per day, with the sequence automatically switching to the next sequential day schedule at the completion of the then current day schedule.

Finally, a holiday schedule is depicted in step 404 which is provided on a daily basis.

What is claimed is:

1. A method for detecting tampering with an electrical service apparatus including an electrical power socket with a ground circuit and at least two power distribution conductors and at least two power service conductors connected to jaw contacts in the socket and an electric power metering apparatus with blade terminals mountable in the jaw contacts, the electric power metering apparatus having a ground member releasably engageable with the ground circuit in the socket when the electric power metering apparatus is mounted in the socket, the method comprising the step of:

detecting a time period between the opening of the ground circuit and the ground member and when the load current through one of the electric power distribution and service conductors equals zero, the time period indicating a tamper event signature.

2. The method of claim 1 further comprising the steps of:

detecting a voltage and a current in at least one electric power service and distribution conductors; and detecting a voltage and a current between the ground circuit in the meter socket and the ground member on the metering apparatus.

3. The method of claim 2 wherein:

the step of detecting the opening of the ground circuit and the ground member includes the step of detecting when the ground voltage is greater than zero at the time when the ground current equals zero; and the step of detecting a time lapse includes detecting when the current through the at least one of the electric power service and distribution conductors equals zero.

4. The method of claim 1 further comprising a step of:

generating a tamper event signal upon detecting the time lapse.

5. The method of claim 4 further comprising the step of:

storing the tamper signal.

6. The method of claim 5 further comprising the step of:

providing a power control switch having at least one contact switchable between open and closed positions, the at least one contact connected between one power service conductor and one power distribution conductor.

7. The method of claim 6 further comprising the steps of:

using the stored tamper signal as an input to switch the power control switch contacts to the open position upon a reapplication of electric power to the electric power service conductors.

8. The method of claim 2 wherein the step of detecting the time period comprises the steps of:

detecting a first event when the ground current equals zero at the time that the ground voltage is greater than zero;

detecting a second event when the current in the at least one of the electric power service and distribution conductors equals zero; and determining the existence of the tamper event signature when the second event is later in time than the first event.

9. The method of claim 8 wherein the step of detecting the first event comprises the step of:

detecting the separation of a ground tab on the electric power metering apparatus inserted into the socket from a ground circuit in the socket.

10. The method of claim 8 wherein the step of detecting the second event comprises the step of:

detecting a separation of the at least one electrical service apparatus blade terminals from the jaw contacts in the socket.

11. A method for detecting tampering with an electrical service apparatus including an electrical power socket with a ground circuit and at least two power distribution conductors and at least two power service conductors connected to jaw contacts in the socket and an electric power metering apparatus with blade terminals mountable in the jaw contacts, the electric power metering apparatus having a ground member releasably engageable with the ground circuit in the socket when the electric power metering apparatus is mounted in the socket, the method comprising the step of:

detecting a first event when the ground current equals zero at the time that the ground voltage is greater than zero;

detecting a second event when the current in the at least one of the electric power service and distribution conductors equals zero; and determining the existence of the tamper event signature when the second event is later in time than the first event.

12. An apparatus for detecting tampering with an electrical service apparatus including an electrical power socket with a ground circuit and at least two power distribution conductors and at least two power service conductors connected to jaw contacts in the socket and an electric power metering apparatus with blade terminals mountable in the jaw contacts, the electric power metering apparatus having a ground member releasably engageable with the ground circuit in the socket when the metering apparatus is mounted in the socket, comprising:

voltage and current sensors for measuring the voltage and the current of at least one of the service and distribution conductors;

ground voltage and ground current sensors; and control means for detecting a tamper signature based on the time relationship between changes in the ground voltage and the ground current and the voltage and the current of the at least one of the power and distribution conductors.

13. The apparatus of claim 12 wherein the control means further comprises:

means for detecting a time delay between first and second events, the first and second events occurring in a time relationship during removal of the electrical power metering apparatus from the socket.

14. The apparatus of claim 12 wherein the electric power metering apparatus comprises:

a housing having a base with a sidewall extending from the base;

line blade terminals mounted through the base and connected to the jaw contacts in the socket electrically connected to electric power service conductors;

load blade terminals mounted through the base and connected to the jaw contacts in the socket connected to the electric power distribution conductors;

switch means, mounted within the housing and having switchable first and second contacts, each first and second contact connected between one line blade and one load blade, the switch means having an input responsive to the control means for switching the first and second contacts of the switch means between open and closed positions.

15. The apparatus of claim 12 wherein the ground circuit includes:

a metal support carried on the electric power metering apparatus engageable with a ground tab on the housing.

16. The apparatus of claim 12 wherein:

the control means generates a tamper event signal upon detecting the tamper signature.

17. The apparatus of claim 16 further comprising:

a memory for storing the tamper signal.

18. The apparatus of claim 16 wherein:

the control means stores the time of day of the detection of the tamper event signature.

* * * * *